(12) United States Patent
Chamseddine et al.

(10) Patent No.: US 8,395,898 B1
(45) Date of Patent: Mar. 12, 2013

(54) SYSTEM, APPARATUS AND METHOD FOR COOLING ELECTRONIC COMPONENTS

(75) Inventors: Amhad Chamseddine, Round Rock, TX (US); Mark Wolfe, Round Rock, TX (US)

(73) Assignee: Dell Products, LP, Round Rock, TX (US)

(*) Notice: Subject to any disclaimer, the term of this patent is extended or adjusted under 35 U.S.C. 154(b) by 139 days.

(21) Appl. No.: 13/047,512

(22) Filed: Mar. 14, 2011

(51) Int. Cl.
*H05K 7/20* (2006.01)

(52) U.S. Cl. ............................ 361/700; 361/694; 361/695

(58) Field of Classification Search .................. None
See application file for complete search history.

(56) References Cited

U.S. PATENT DOCUMENTS

| | | | |
|---|---|---|---|
| 6,082,623 A * | 7/2000 | Chang ............................ 236/49.3 |
| 6,122,167 A | 9/2000 | Smith et al. |
| 6,172,611 B1 | 1/2001 | Hussain et al. |
| 6,226,178 B1 | 5/2001 | Broder et al. |
| 6,357,515 B1 * | 3/2002 | Bhatia ............................ 165/80.3 |
| 6,414,844 B1 | 7/2002 | Shimada et al. |
| 6,434,000 B1 | 8/2002 | Pandolfi |
| 6,470,289 B1 | 10/2002 | Peters et al. |
| 6,487,076 B1 | 11/2002 | Wang |
| 6,754,072 B2 | 6/2004 | Becker et al. |
| 6,848,499 B1 | 2/2005 | Bhatia |
| 6,859,364 B2 | 2/2005 | Yuasa et al. |
| 6,906,901 B1 | 6/2005 | Liu |
| 7,079,394 B2 | 7/2006 | Mok |
| 7,082,031 B2 | 7/2006 | Leija et al. |
| 7,190,577 B2 | 3/2007 | Ali |
| 7,269,005 B2 * | 9/2007 | Pokharna et al. ........ 361/679.48 |
| 7,297,438 B2 | 11/2007 | Kimoto |
| 7,312,985 B2 | 12/2007 | Lee et al. |
| 7,325,590 B2 | 2/2008 | Kim et al. |
| 7,412,306 B2 | 8/2008 | Katoh et al. |
| 7,447,030 B2 | 11/2008 | Hwang et al. |

(Continued)

FOREIGN PATENT DOCUMENTS

| | | |
|---|---|---|
| EP | 1026571 A2 | 8/2000 |
| EP | 1574933 A1 | 5/2009 |

(Continued)

OTHER PUBLICATIONS

Office Action for U.S. Appl. No. 12/204,160, mailed Oct. 29, 2009, 8 pgs.

*Primary Examiner* — Gregory Thompson

(57) ABSTRACT

Apparatuses, systems and methods for effective cooling of electronic devices are presented herein. More specifically, embodiments of the present invention comprise one or more heat pipes thermally coupled to electronic components and to a first heat sink and a second heat sink. The heat pipes are constructed to transfer heat generated at the one or more electronic components to the first heat sink and to the second heat sink. The first heat sink is operable to transfer heat energy to the ambient air using dissipation or advection. The second heat sink is able to transfer heat energy to the ambient air using dissipation. A controller is operable to switch between a passive mode of operation and an active mode of operation. The system can operate in a passive mode only in temperatures less than 25 degrees Celsius, can switch operation between a passive mode and an active mode without throttling in temperatures less than 60 degrees Celsius, can switch operation between a passive mode and an active mode in temperatures greater than 60 degrees Celsius while maintaining about 85% or greater maximum processing speed, and can operate in a passive only mode with minimal throttling.

19 Claims, 17 Drawing Sheets

U.S. PATENT DOCUMENTS

| | | |
|---|---|---|
| 7,458,415 B2 | 12/2008 | Hashimoto et al. |
| 7,490,656 B2 * | 2/2009 | Senyk et al. ................. 165/11.1 |
| 7,647,788 B2 | 1/2010 | Okuda et al. |
| 7,886,816 B2 * | 2/2011 | Ouyang ........................ 165/299 |
| 7,903,409 B2 * | 3/2011 | Patel et al. .................... 361/700 |
| 8,016,023 B2 * | 9/2011 | Senyk et al. ................. 165/11.1 |
| 2005/0068737 A1 | 3/2005 | Leija et al. |
| 2005/0276018 A1 | 12/2005 | Moore et al. |
| 2007/0298316 A1 | 12/2007 | Yamamoto et al. |
| 2008/0036076 A1 | 2/2008 | Ouyang |
| 2008/0093056 A1 | 4/2008 | Hwang et al. |
| 2008/0112130 A1 | 5/2008 | Nakamura |
| 2009/0021908 A1 | 1/2009 | Patel et al. |
| 2009/0144568 A1 | 6/2009 | Fung |

FOREIGN PATENT DOCUMENTS

| | | |
|---|---|---|
| JP | 11-110085 A | 4/1999 |
| JP | 2001-217366 A | 8/2001 |
| JP | 2009-88125 | 4/2009 |
| JP | 2009-217773 | 9/2009 |
| JP | 2009-217776 | 9/2009 |

* cited by examiner

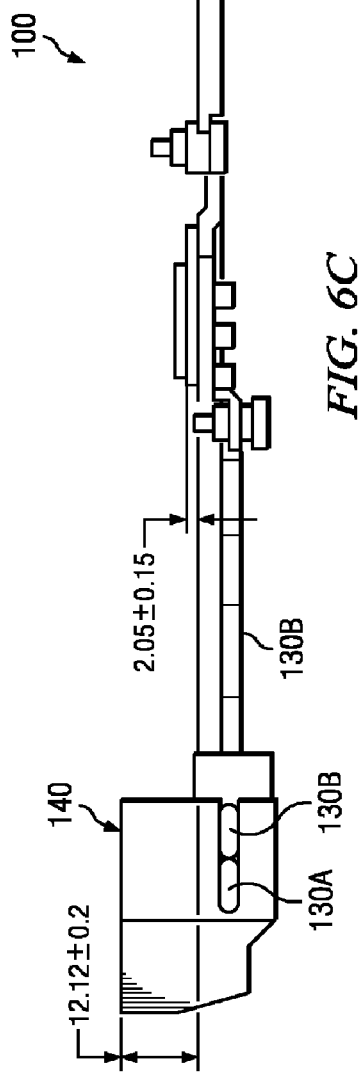
FIG. 6C
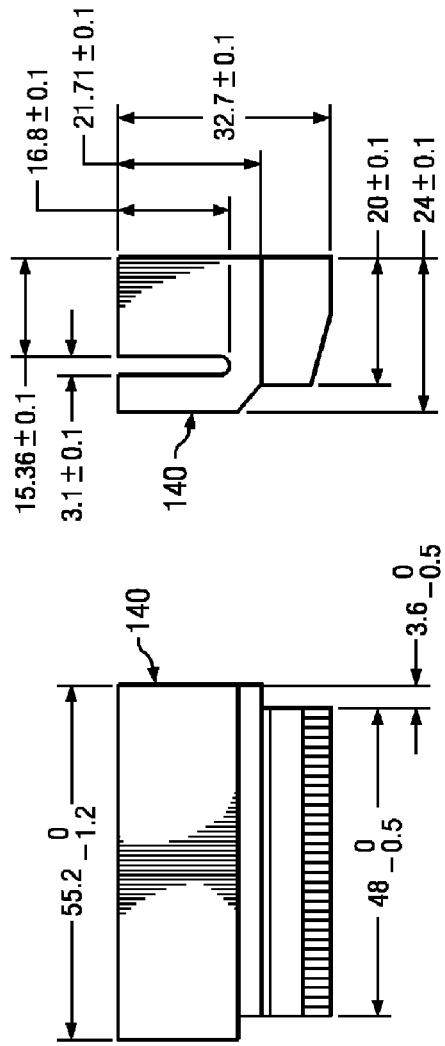
FIG. 6G
FIG. 6F
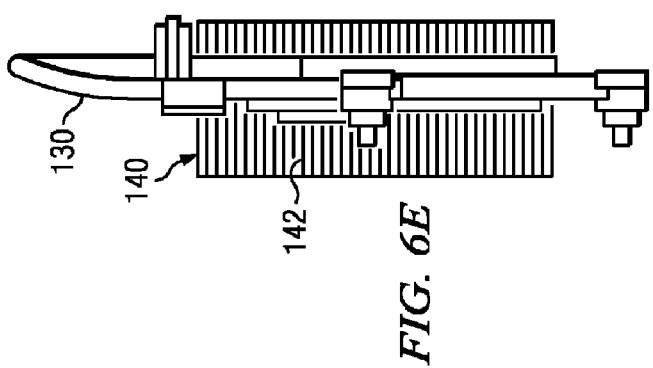
FIG. 6E

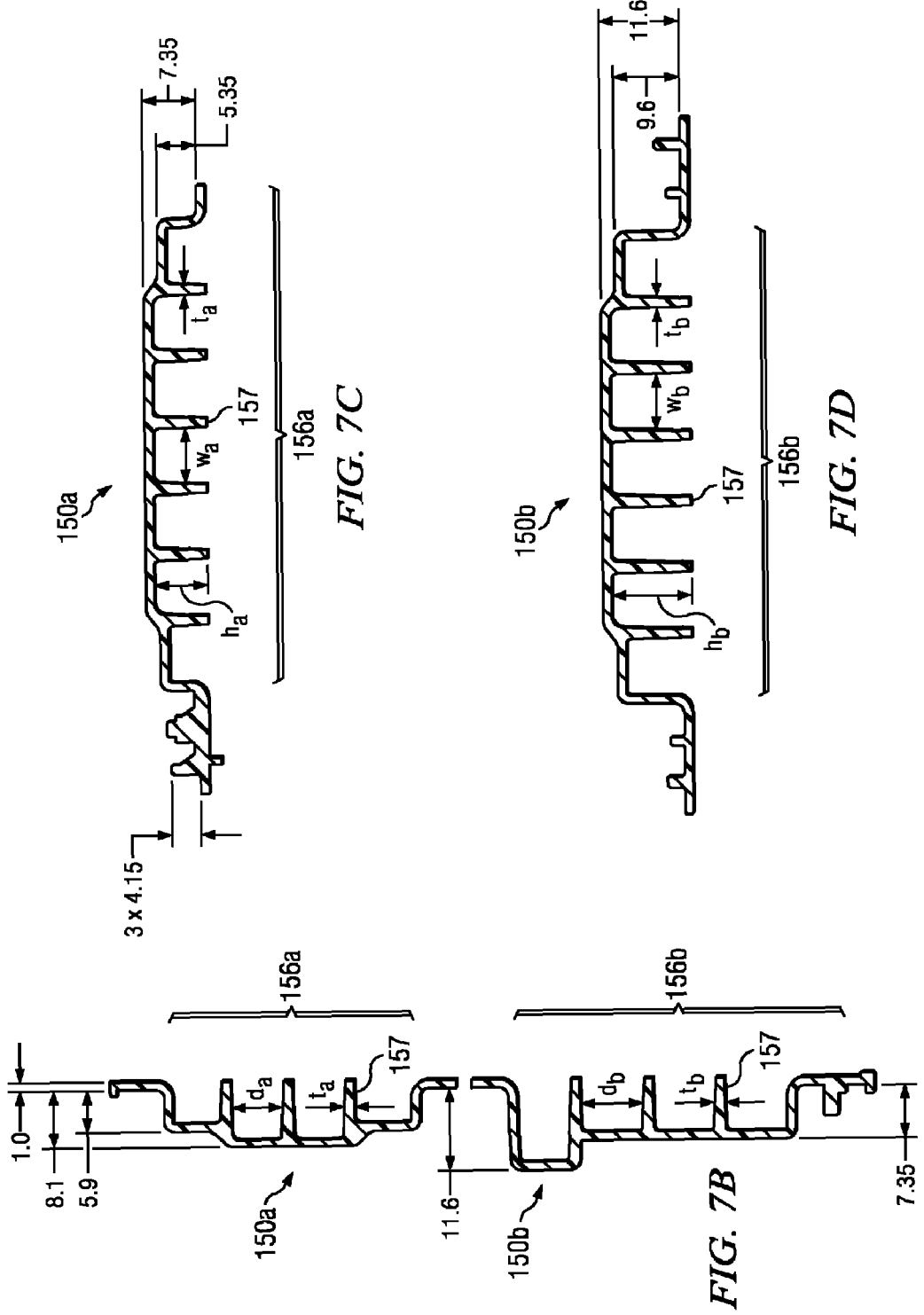

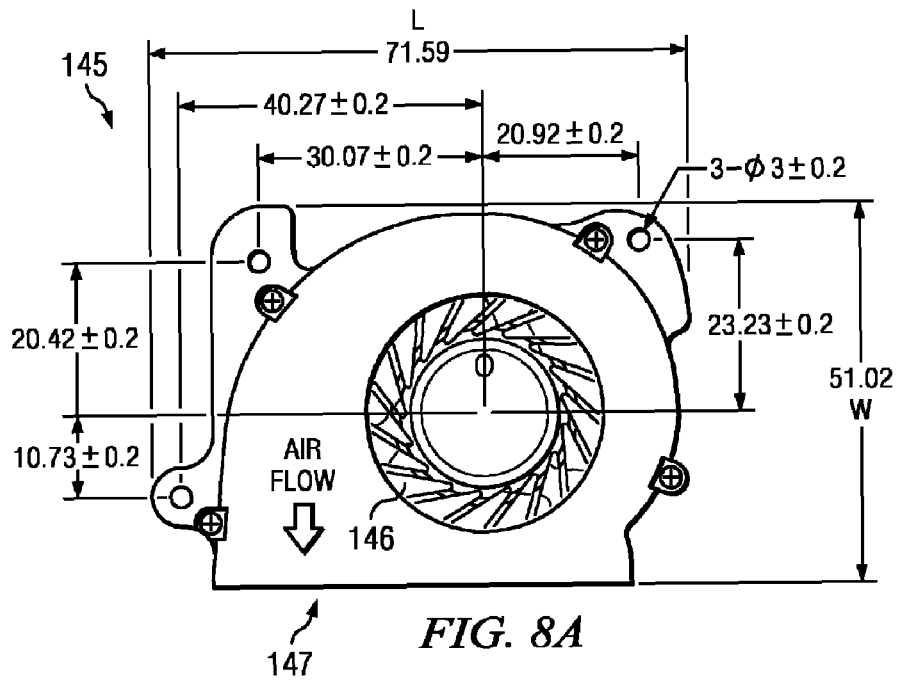
FIG. 8A
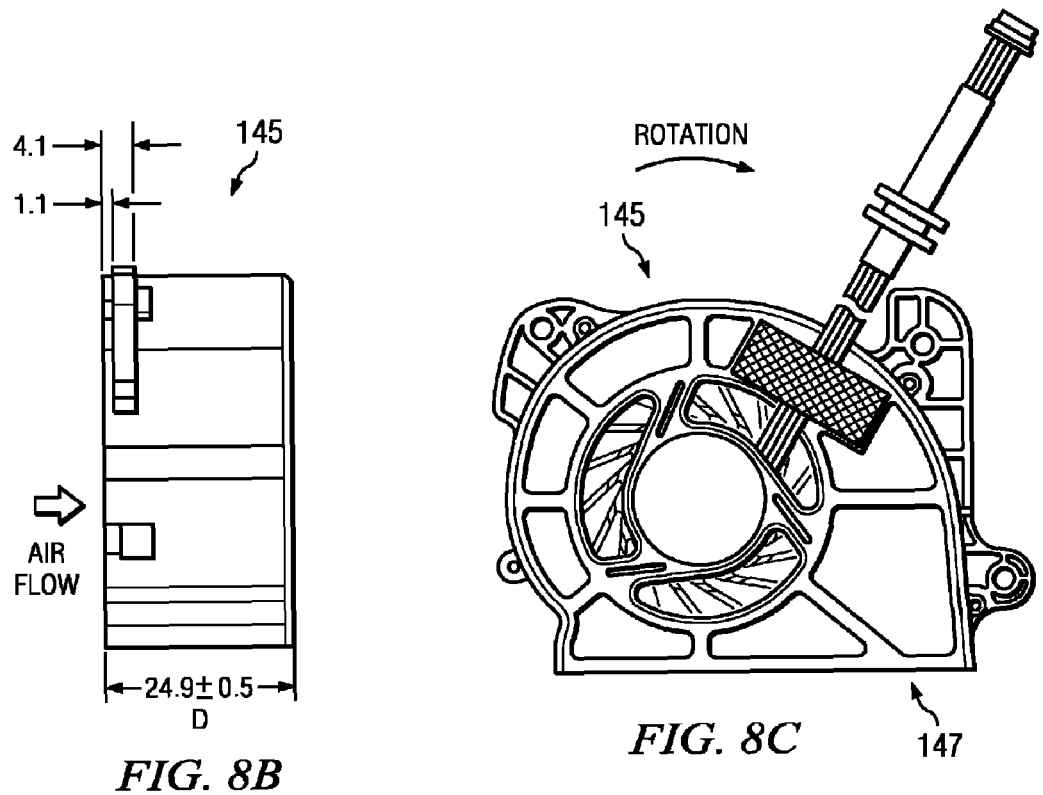
FIG. 8B
FIG. 8C

FIG. 11

UMA, 17 2.7 GHz, 4 GB Memory — Both configurations running BIT 100%

Hybrid with thermal pads (1110)

| | Time | Fan RPM |
|---|---|---|
| System Power On | 0 | 0 |
| Launch Burn-In | 5:00 | 0 |
| Fan On | 9:46 | 3000 |
| Fan Off | 11:50 | 0 |
| Fan On | 14:15 | 3000 |
| Fan Off | 18:20 | 0 |
| Fan On | 20:25 | 3000 |
| Fan Off | 25:15 | 0 |
| Fan On | 27:45 | 3000 |

Number of fan events: 7

Hybrid without thermal pads (1140)

| | Time | Fan RPM |
|---|---|---|
| System Power On | 0 | 0 |
| Launch Burn-In | 5:00 | 0 |
| Fan On | 8:10 | 3000 |
| Fan Off | 9:40 | 0 |
| Fan On | 11:05 | 3000 |
| Fan Off | 13:16 | 0 |
| Fan On | 14:28 | 3000 |
| Fan Off | 17:45 | 0 |
| Fan On | 19:00 | 3000 |
| Fan Off | 22:07 | 0 |
| Fan Step | 23:32 | 4300 |
| Fan Off | 23:49 | 3000 |
| Fan Off | 24:09 | 0 |
| Fan On | 24:48 | 4300 |
| Fan Step | 25:10 | 3000 |
| Fan Off | 27:42 | 0 |

Number of fan events: 14

UMA, 17 2.7 GHz, 4 GB Memory — Both configurations running BIT 65%

Hybrid with thermal pads (1120)

| | Time | Fan RPM |
|---|---|---|
| System Power On | 0 | 0 |
| Launch Burn-In | 5:00 | 0 |
| Fan On | 12:10 | 3000 |
| Fan Off | 14:18 | 0 |
| Fan On | 17:38 | 3000 |
| Fan Off | 20:34 | 0 |
| Fan On | 23:44 | 3000 |
| Fan Off | 26:49 | 0 |
| Fan On | EOT | 3000 |

Number of fan events: 6

Hybrid without thermal pads (1150)

| | Time | Fan RPM |
|---|---|---|
| System Power On | 0 | 0 |
| Launch Burn-In | 5:00 | 0 |
| Fan On | 8:41 | 3000 |
| Fan Off | 10:43 | 0 |
| Fan On | 12:20 | 3000 |
| Fan Off | 14:18 | 0 |
| Fan On | 15:55 | 3000 |
| Fan Off | 18:05 | 0 |
| Fan On | 19:43 | 3000 |
| Fan Off | 22:20 | 0 |
| Fan On | 24:01 | 3000 |
| Fan Off | 26:32 | 0 |
| Fan On | 28:08 | 3000 |

Number of fan events: 11

UMA, 17 2.7 GHz, 4 GB Memory — Both configurations running BIT 50%

Hybrid with thermal pads (1130)

| | Time | Fan RPM |
|---|---|---|
| System Power On | 0 | 0 |
| Launch Burn-In | 5:00 | 0 |
| Fan On | NA | 0 |
| Fan Off | NA | 0 |
| Fan On | NA | 0 |
| Fan Off | NA | 0 |
| Fan On | NA | 0 |
| Fan Off | NA | 0 |
| Fan On | 27:45 | 0 |

Number of fan events: 0

Hybrid without thermal pads (1160)

| | Time | Fan RPM |
|---|---|---|
| System Power On | 0 | 0 |
| Launch Burn-In | 5:00 | 0 |
| Fan On | 9:33 | 3000 |
| Fan Off | 10:20 | 0 |
| Fan On | 12:54 | 3000 |
| Fan Off | 14:01 | 0 |
| Fan On | 16:48 | 3000 |
| Fan Off | 17:46 | 0 |
| Fan On | 20:12 | 3000 |
| Fan Off | 21:20 | 0 |
| Fan On | 23:18 | 3000 |
| Fan Off | 24:26 | 0 |
| Fan On | 27:07 | 3000 |
| | END OF TEST | |

Number of fan events: 11

SYSTEM, APPARATUS AND METHOD FOR COOLING ELECTRONIC COMPONENTS

TECHNICAL FIELD

Embodiments of the invention relate generally to electronic devices such as mobile computing devices. More particularly, embodiments of the invention relate to cooling solutions for use with such electronic devices. Even more specifically, certain embodiments of the invention relate to the use of passive and active cooling portions as well as passive and active modes of operation to remove heat from circuits utilized in such electronic devices.

BACKGROUND

With the advent of the computer age, electronic systems have become a staple of modern life, and some may even deem them a necessity. Part and parcel with this spread of technology is an ever greater drive for more functionality from these electronic systems. A microcosm of this quest for increased functionality is the size and capacity of various semiconductor devices. From the 8 bit microprocessor of the original Apple I, through the 16 bit processors of the original IBM PC AT, to the current day, the processing power of semiconductors has grown while the size of these semiconductors has consistently been reduced.

As semiconductors have evolved into these complex systems, almost universally the connectivity and power requirements for these semiconductors have been increasing. Generally speaking, the higher the clock frequency utilized with a semiconductor, the greater that semiconductor's power consumption (all other aspects being equal). Thus, modern electronics and computing components may run at relatively higher temperatures than previous generations. Higher temperatures are undesirable due to the decrease in performance of CPUs and other microprocessors (throttling), reliability of memory devices or operating life of electronic components. As a result, cooling systems have been developed to control the operating temperatures of various components.

The difficulty in cooling these high-speed electronic components is exacerbated in the mobile computing environment, where packaging limitations (e.g., size and weight), electronic components and battery life, and the resulting space and power requirements may raise further impediments to adequate cooling of electronic components. These problems may manifest themselves even more dramatically in the context of implementing mission critical mobile computing platforms, such as electronic components designed to be utilized by members of the armed services in combat situations, in extreme weather conditions (e.g., sandy, rainy, cold, hot, etc.), or other arenas or situations where the proper operation of these electronic components is of the utmost importance. As these mission critical mobile devices may have a number of operational constrains imposed on them, including shock resistance, imperviousness to liquids, operating temperature, radiation emissions, etc., cooling electronic components of such mission critical mobile devices may be even more difficult, as necessities imposed by these other constraints (for example, sealed portions of chassis, chassis material, etc.) may further limit the cooling systems which may be utilized.

As it is still desired to use high-speed electronic components in these various types of mobile computing devices (especially in the context of mission critical devices where processing power may provide a vital advantage), what is required are sophisticated and effective cooling systems to remove heat from electronic components in mobile computing devices.

SUMMARY

Modern high-speed electronic components including microprocessors, ASICs or the like are used in laptop computers and other mobile computing devices. In fact, in many cases the use of high-speed electronic components may provide vital or decisive in certain mission critical applications. These high-speed modern electronics may, however, generate a great deal more heat relative to their lower speed counterparts. Thus, previously utilized cooling solutions may prove ineffective for use with these high-speed electronic components. What is desired, then, are effective cooling solutions which may be utilized with computing devices and, in particular, embodiments of which may be effectively utilized with mission critical mobile computing devices, including those using high-speed electronic components, given the commensurate constraints imposed by the desire to comply with promulgated standards or other requirements of these mission critical mobile computing devices.

Apparatuses, systems and methods for effective cooling of mobile computing devices using hybrid cooling systems and methods for managing the removal of heat energy from the mobile computing devices are disclosed.

In one embodiment a cooling system may be a hybrid cooling system. A hybrid cooling system may have a passive cooling portion and an active cooling portion. One or more modes of operation may be associated with the passive cooling portion or the active cooling portion.

A passive portion of a hybrid cooling system may be configured based on the operating parameters of one or more electronic components, the parameters of the computer, the environment in which the computer is to be operated, or some combination. A passive cooling portion may be configured such that heat generated by electronic components operating at a selected percent of maximum operating capacity can be transferred to the environment without using the active portion of the cooling system. A passive mode of operation generally refers to removing heat by diffusion or otherwise without operating a fan, blower, or other air flow device that requires power. An advantage to a passive portion and mode of operation is that no battery power is required, such that a battery charge lasts longer. In an everyday setting, this may be somewhat important. In certain situations, such as a police officer on patrol or a soldier on a combat mission, longer battery life may be critical. Another advantage of a passive cooling portion and mode of operation is that less noise is generated by the mobile computing device. Again, in certain situations, a minimal amount of noise may be very important. Another advantage of a passive cooling portion and mode of operation is that reliability of electronic components (or the mobile computing device itself) may be increased. Yet another advantage of a passive cooling portion and mode of operation is that performance of the electronic components may be improved, or at least not throttled, based on the temperature of the electronic component.

An active portion of a hybrid cooling system may be configured based on the operating parameters of one or more electronic components, the parameters of the computer, the environment in which the computer is to be operated, the battery power available, or some combination. An active cooling portion may be configured such that heat generated by electronic components operating at a selected percent of maximum operating capacity can be transferred to the environment using advection and diffusion, such as a fan blowing air across fins in a heat sink. Active cooling portions and modes of operation may be designed to remove heat rapidly and efficiently, but there is still an associated noise and battery usage during operation.

A hybrid cooling system using an active portion and a passive cooling portion may provide substantially optimal system performance. A passive cooling portion may be the primary mechanism for heat removal and may function substantially always. For example, the passive cooling portion may function any time there is a temperature differential between electronic components and the environment or the electronic components are powered. In an active mode of operation, the active cooling portion may assist the passive cooling portion to reduce the temperature inside the mobile computing device. In a passive mode of operation, the active cooling portion may be deactivated to save battery power, reduce noise, etc. A controller may determine whether to activate an active portion of a hybrid cooling system. Activating an active cooling portion may be based on ambient air conditions, temperature or performance of one or more electronic components, the temperature or performance of one or more hybrid cooling system components, or some other criteria. Deactivating an active portion may be based on the temperature or performance of one or more electronic components, the temperature or performance of one or more hybrid cooling system components, or some other criteria.

In one embodiment, a cooling method may be a hybrid cooling method. A hybrid cooling method may have a passive cooling mode always in operation and an active cooling mode operational a minimal amount of time.

Certain technical advantages may be obtained through the use of embodiments of the present invention. More specifically, using embodiments of a hybrid cooling system, heat may be effectively removed from electronic components, such that high-speed electronic components may be utilized in mobile computing environments. Operating in a passive cooling mode may allow the computer to operate silently or at a very low threshold, may reduce power consumption for extended battery life, reduce wear on fan motors, reduce or eliminate the need for throttling CPU performance, and other advantages.

Furthermore, a chamber utilized in such cooling solutions may be sealed from the remainder of a chassis of a mobile computing device such that elements entering the chamber through any of the vents may not readily enter the interior of the chassis and electronics components within the chassis are protected from these elements. Consequently, cooling systems having a sealed chamber may cool high-speed electronic components effectively and may also thermally isolate these same components effectively.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 6A-6G depict an exploded view and various partial views of one embodiment of a passive cooling portion of a hybrid cooling system;

FIGS. 7A-7F are side and partial views of one embodiment of a bezel;

FIGS. 8A-8C are front, side and back views of one embodiment of an air flow device for use in an active portion of a hybrid cooling system;

FIG. 11 depicts performance charts for one embodiment of a hybrid cooling system operating at different processor speeds.

DETAILED DESCRIPTION

Figure 1A:
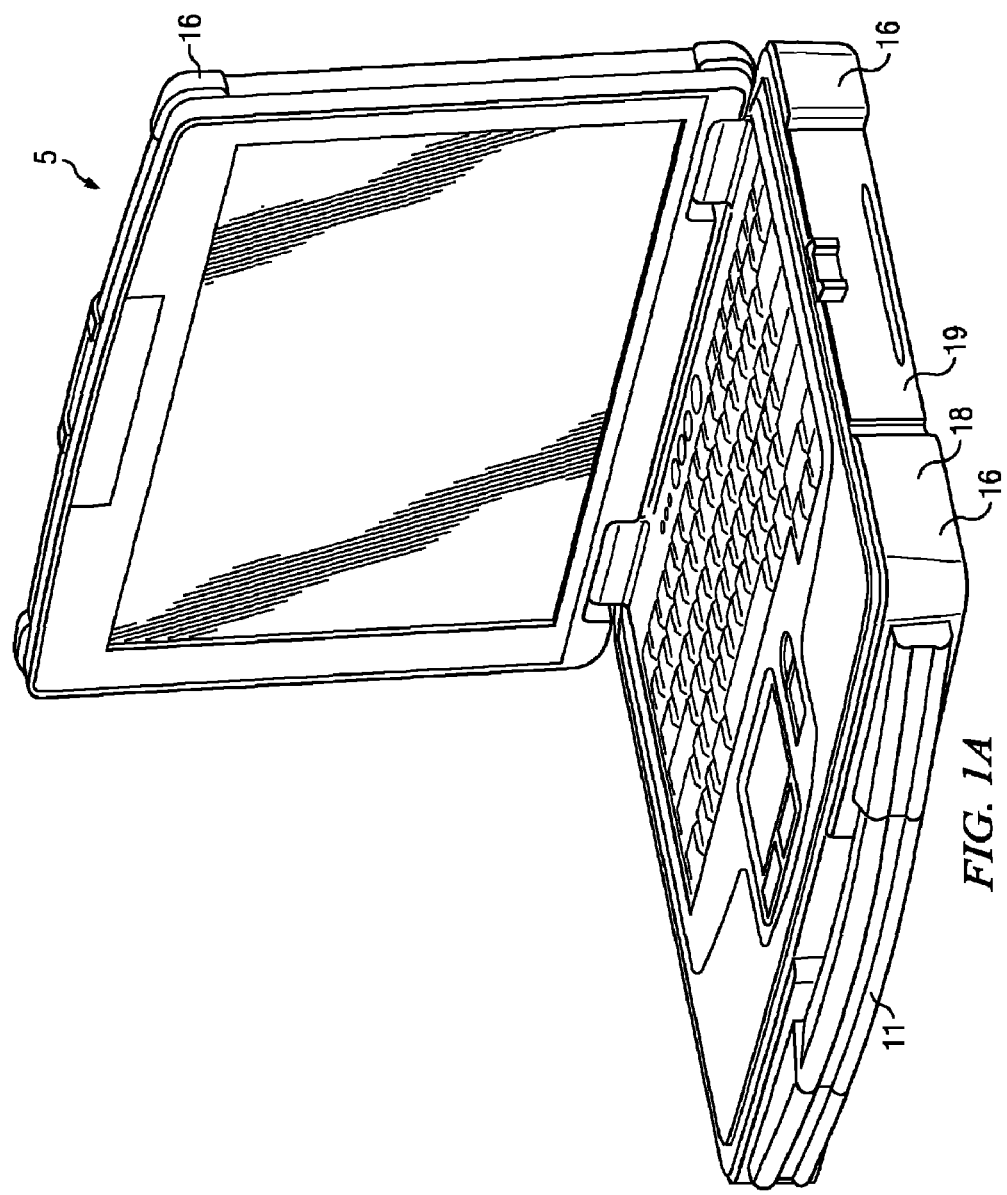
FIGS. 1A and 1B are depictions of one embodiment of a mobile computing device.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

As discussed above, the advantages of mobile computing devices are sometimes offset by the problems associated with the cooling of electronic components. This problem becomes especially apparent in the context where packaging limitation and commensurate space constraints may present certain impediments, such as mobile computing devices. These problems may manifest themselves even more dramatically when it is desired to utilize such mobile computing devices in a mission critical setting, where a number of requirements and demands may be placed on such mobile computing devices.

Implementing mobile electronic devices for mission critical settings may therefore entail engineering and manufacturing these mobile computing devices to tolerate a variety of conditions or events and to comply with a variety of other requirements, which may include, for example, drop or impact standards, tolerance or resistance to water ingress, operating ranges, etc. Meeting these various standards may, however, require implementing designs or solutions which place further limitations on the types of cooling solutions which may be utilized with the mobile electronic device.

Figure 1B:
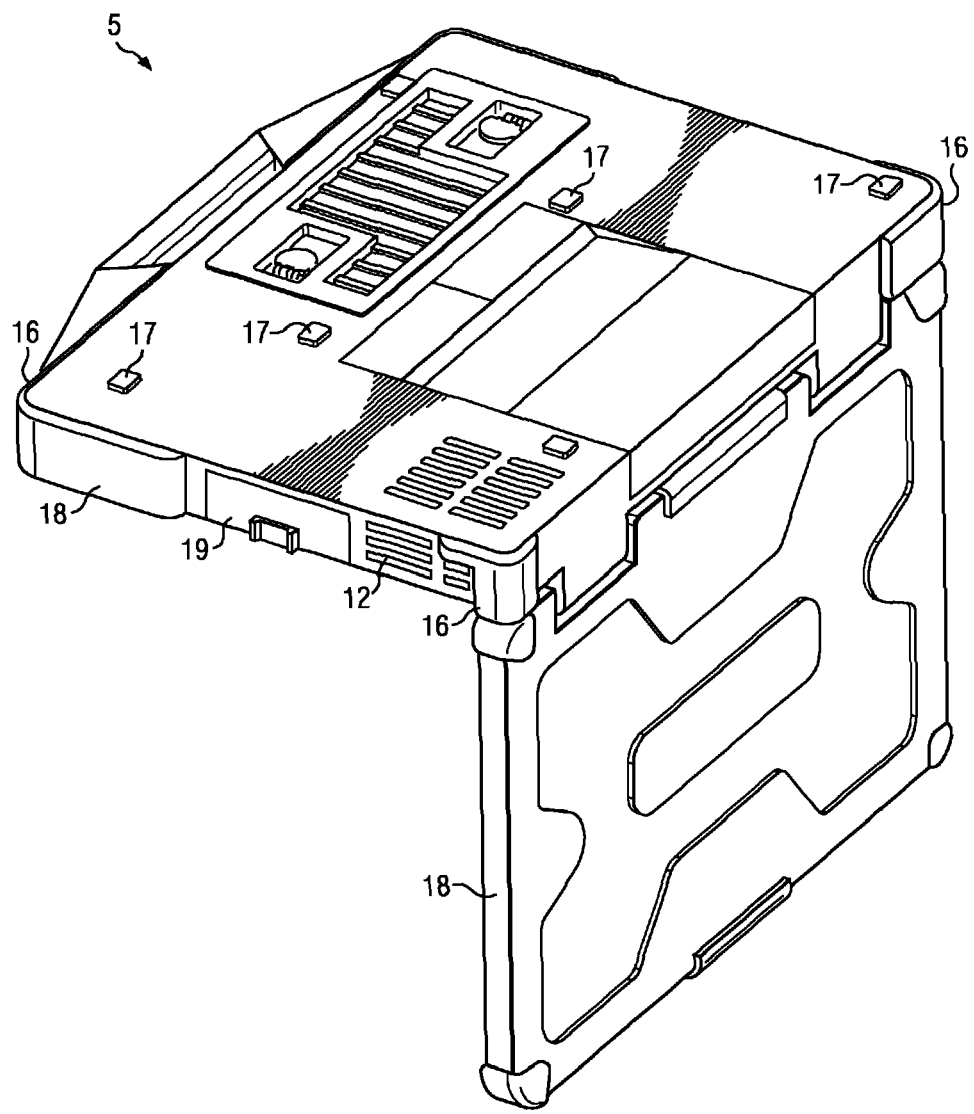

FIGS. 1A and 1B depict one embodiment of a mobile computing device 5 with chassis 15. Mobile computing device 5 may be intended for normal operation within a controlled office environment or may be intended for operation in extreme environmental conditions, such as in a police or military vehicle. Based on an intended use, mobile computing device 5 may be constructed to conform to one or more standards promulgated by a standards body or a potential user. These standards may pertain to environmental tests designed to prove that mobile computing device 5 can remain operational in a variety of conditions. Environmental tests may cover areas such as drop, vibration, shock, water resistance, altitude, high temperature, low temperature, high temperature, shock, humidity, etc. Examples of such standards include those issued by the U.S. Army's Developmental Test Command, including MIL-STD-810F, MIL-STD-461E, etc.

To comply with certain of these standards then, mobile computing device 5 may be constructed to isolate or protect electronic components of mobile computing device 5 from shock, vibration, water, etc. Consequently chassis 15 may be sealed, of a certain thickness, constructed of a certain type of material, etc. The design of such a chassis 15 may, however, place restraints on the types of cooling devices or systems which may be used in conjunction with mobile computing device 5. In some embodiments, mobile computing device 5 may include handle 11, vent 12, corner dampeners 16, bottom surface dampeners ("feet") 17, side surface dampeners 18, I/O doors 19 and other protective components or access points. The position and size of various components and access points may also limit the size of a cooling system.

The design of other components of mobile computing device 5 may, either because of being designed to meet certain standards or for other reasons altogether, also place constraints on the types of cooling devices or systems which may be utilized with mobile computing device 5. These types of constraints are problematic, as certain of the standards pertaining to mobile computing device may pertain to operating temperature of electronic components of mobile computing device 5, to an operating temperature of mobile computing device 5 as a whole, to an ambient temperature range in which mobile computing device must maintain functionality for a certain amount of time, etc.

To meet these standards, in conjunction with the limitations or constraints placed on the cooling devices or systems used by components of mobile computing device 5, attention is now directed to hybrid cooling apparatuses, systems and methods for effective cooling of electronic devices.

Figure 2:
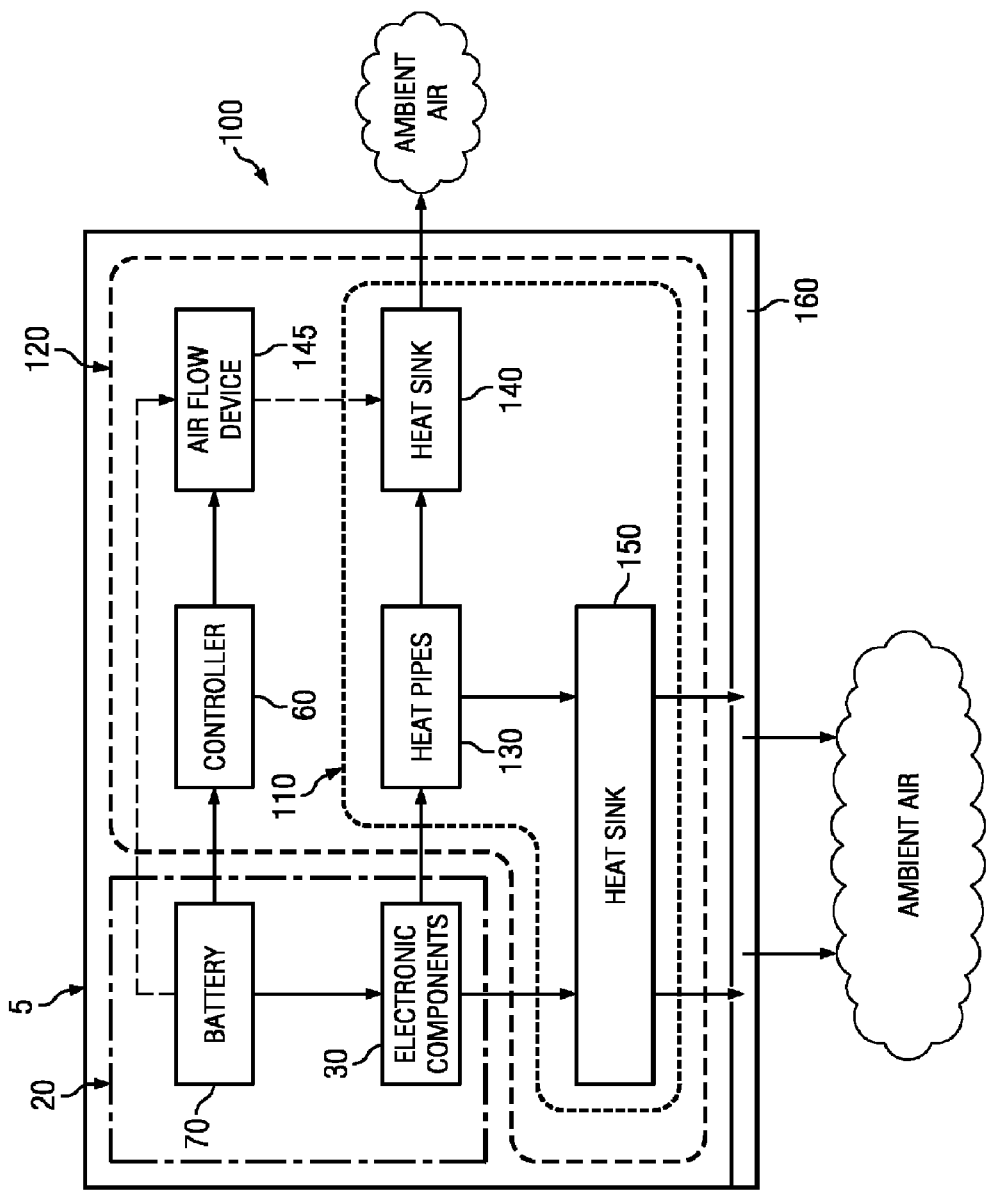
FIG. 2 is a block diagram of one embodiment of a hybrid cooling system.

FIG. 2 depicts a simplified block diagram of one embodiment of mobile computing device 5 having electronic components 30 such as a CPU, GPU or memory, controller 60 and battery 70. Mobile computing device 5 may further include hybrid cooling system 100 comprising passive cooling portion 110 and active cooling portion 120.

In one embodiment, passive cooling portion 110 of hybrid cooling system 100 may include one or more heat pipes 130, first heat sink 140, second heat sink 150 and bezel 160. First heat sink 140 may be thermally coupled to heat pipes 130 and connected to air flow device 145 such that air flowing out of air flow device 145 flows through first heat sink 140 to facilitate advective cooling by first heat sink 140. Second heat sink 150 may be coupled to heat pipes 130 coupled to electronic components 30 and further coupled to bezel 160. In a passive cooling mode of operation, when heat energy is generated by electronic components 30, heat pipes 130 may transfer the heat energy to first heat sink 140 and second heat sink 150, and first heat sink 140 and second heat sink 150 may collectively transfer the heat energy away from electronic components 30 and to the environment such that mobile computing device 5 is not using power to cool electronic components 30.

Heat pipe 130 (the term "heat pipe" being used collectively to refer to a heat pipe or a thermosiphon herein) is a heat transfer mechanism that combines the principles of both thermal conductivity and phase transition to efficiently transfer heat between heat generating sources, such as electronic components 30, and first heat sink 140. In some embodiments, heat pipe 130 consists of a sealed pipe or tube made of a material with high thermal conductivity such as copper or aluminum. Heat pipe 130 generally has a working fluid inside the thermally conductive outer surface.

Heat pipes 130 contain a fluid such as a water-talc solution or other type of working fluid such as helium, nitrogen, ammonia, acetone, methanol, flutec, PP2, ethanol, water, toluene, mercury, sodium, lithium, silver, copper, etc., and are constructed to transfer heat generated at the one or more electronic components 30 to first heat sink 140. A vacuum pump is used to evacuate air from heat pipe 130. Heat pipe 130 is then filled with a volume of fluid selected based on an operating range. Due to the partial vacuum that is near or below the vapor pressure of the fluid, some of the fluid in heat pipe 130 may be in the liquid phase and some may be in the gas phase. In some embodiments, at the first end of heat pipe 130, the liquid in contact with the thermally conductive solid surface turns into a vapor by absorbing heat from that surface. The vapor condenses back into a liquid at the other end of heat pipe 130, releasing the latent heat. The liquid then returns to the first end through either capillary action or gravity action where it repeats the cycle. In addition, the internal pressure of heat pipe 130 can be set or adjusted to facilitate the phase change depending on the demands of the working conditions of hybrid cooling system 100.

In some embodiments, a wick may exert capillary pressure on the liquid phase of the fluid. In some embodiments, a wick may be a sintered metal powder or a series of grooves parallel to the pipe axis, but those skilled in the art will appreciate that a wick may be any material capable of exerting capillary pressure on the condensed liquid to wick it back to areas near electronic components 30 or other heat sources. In some embodiments, heat pipe 130 may not need a wick structure. Gravity or some other source of acceleration may be sufficient to cause the condensed liquid to flow back to the first end.

Heat pipes 130 are generally used to transfer heat energy generated by electronic components 30 along the length of heat pipes 130 to first heat sink 140. Heat pipes 130 may also transfer heat energy generated by electronic components 30 across heat pipes 130 to second heat sink 150. Thus, heat pipes 130 as used herein may serve as a conduit for releasing heat energy to the environment using first heat sink 140 in combination with second heat sink 150.

Hybrid cooling system 100 may further include active portion 120 including controller 60, the one or more heat pipes 130, the first and second heat sinks 140 and 150, bezel 160 and air flow device 145 that is powered on or otherwise activated to force air across first heat sink 140 to increase the heat transfer rate.

Controller 60 may be implemented as hardware or software. In some embodiments, controller 60 comprises a set of computer instructions residing in memory and executable by a processor. Controller 60 may be a separate component or set of instructions, or may be integrated with other electronic components 30 or executed by a CPU. Controller 60 may be used to monitor electronic component temperatures, determine whether a condition exceeds a condition (e.g. temperature exceeds a predetermined threshold, processor usage exceeds a threshold percentage, processor speed drops below a desired percent of max speed, etc) and determine when to activate and deactivate air flow device 145. Controller 60 can monitor the charge in battery 70 and the temperature of electronic components 30 to determine when or if to activate air flow device 145. When controller 60 deactivates air flow device 145, hybrid cooling system 100 operates in the passive mode of operation. When controller activates air flow device 145, hybrid cooling system 100 is able to cool electronic components 30 and portions of hybrid cooling system 100 using both the passive cooling portion and the active cooling portion.

Determining when to activate and deactivate air flow device 145 may also include when to step up or step down (increase or decrease) the RPM of a motor or at what RPM should air flow device 145 be operating. Controller 60 may activate air flow device 145 to a predetermined RPM (e.g. 100%) or may activate air flow device 145 to follow a predetermined protocol (e.g. 100% max for 2 minutes, then 50% for 2 minutes; 100% max until processor speed is 100%, then 50% for 1 minute, etc.).

Heat pipes 130 may transfer heat from electronic components 30 to first heat sink 140 in a passive mode of operation or an active mode of operation. Heat pipes 130 may be configured to substantially optimize cooling performance when hybrid cooling system 100 is operating solely in the passive mode of operation, and may further be configured such that, when hybrid cooling system 100 is operating in an active mode of operation, heat pipes 130 may effectively remove heat and heat pipes 130 may also be cooled to a desired temperature.

First heat sink 140 may transfer heat from heat pipes 130 to the ambient air using passive and active cooling and may operate in a passive mode of operation and an active mode of operation. In some embodiments, fins on first heat sink 140 may become heat saturated during passive cooling. As the fins become heat saturated, passive cooling, such as by dissipation of heat, may transfer heat energy from first heat sink 140 to ambient air. In some embodiments, when hybrid cooling system 100 is operating in an active mode of operation, air flow device 145 may force air drawn in from the environment to flow across the fins of first heat sink 140 to remove, such as by advection and dissipation, heat generated by electronic components, and may further cool the fins to a desired temperature to increase the efficiency of first heat sink 140.

Second heat sink 150 may transfer heat across heat pipes 130 from electronic components 30 to bezel 160. In some embodiments, second heat sink 150 may provide continuous passive cooling to help cool heat pipes 130 to increase the efficiency of hybrid cooling system 100.

Bezel 160 may be manufactured from a material or alloy selected for thermal resistance such that the number of hot spots or the temperature of any one hot spot is reduced so that a user can operate mobile computing device 5 safely. For example, a user may want to operate mobile computing device 5 sitting down with device 5 in their lap. Magnesium is one material that bezel 160 may be manufactured from such that a hot spot from heat generated by electronic components 30 remains at a desired level.

Figure 3A:
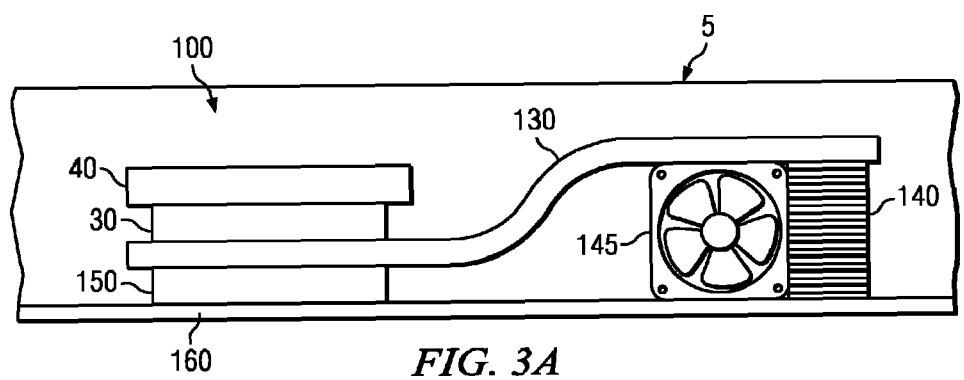
FIGS. 3A and 3B are side views of embodiments of a hybrid cooling system.
Figure 3B:
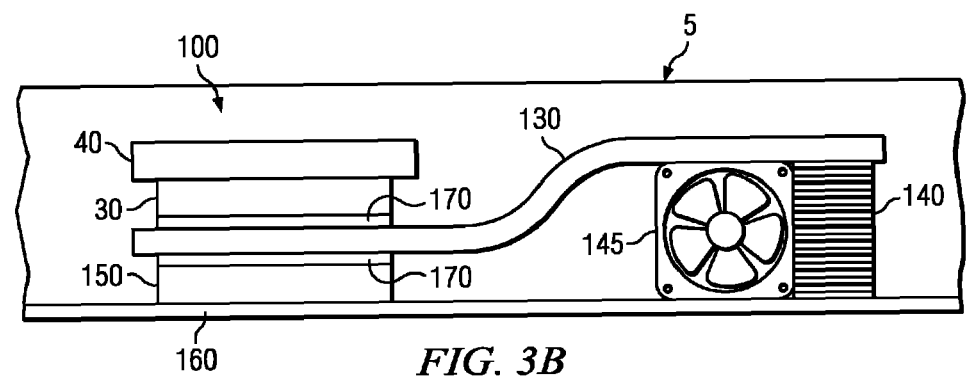

FIGS. 3A and 3B depict cutaway side views of embodiments of mobile computing device 5 having hybrid cooling system 100. Electronic components 30, which may include processors, memories, power supplies, etc are positioned inside mobile computing device 5, such as electronic component 30 mechanically coupled to motherboard 40. As depicted in FIG. 3A, embodiments of hybrid cooling system 100 may include heat pipe 130 in contact with electronic component 30, first heat sink 140 thermally coupled to heat pipe 130, air flow device 145 thermally coupled to first heat sink 140, second heat sink 150 thermally coupled to heat pipe 130, and bezel 160 thermally coupled to second heat sink 150. As depicted in FIG. 3B, embodiments of hybrid cooling system 100 may include heat pipe 130 in contact with thermally conductive pad 170 and thermally conductive pad 170 in contact with electronic component 30 such that heat pipe 130 is thermally coupled to electronic component 30, first heat sink 140 thermally coupled to heat pipe 130, air flow device 145 coupled to first heat sink 140 such that air flowing out of air flow device 145 is forced across fins or other heat transfer features and further forced out of mobile computing device 5 into the environment, second heat sink 150 in contact with thermally conductive pad 170 and thermally conductive pad 170 in contact with heat pipe 130 such that heat pipe 130 is thermally coupled to second heat sink 150, and bezel 160 thermally coupled to second heat sink 150.

During a passive or active mode of operation, heat energy generated by electronic component 30 is transferred to heat pipe 130 such that heat energy is drawn away from motherboard 40. Drawing heat away from motherboards, graphics cards, and other components inside mobile computing device 5 may advantageously increase reliability of mobile computing device 5. Heat transferred to heat pipes 130 may then be transferred along heat pipes 130 to first heat sink 140 or across heat pipes 130 to second heat sink 150. Heat energy transferred from heat pipes 130 may saturate fins or other heat exchange elements of first heat sink 140 in contact with ambient air such that heat can be dissipated to the ambient air without electrical power in a passive mode of operation, or air may be forced across heat exchange elements to utilize dissipative and advective convection to increase the heat transfer rate to the ambient air in an active mode of operation. Heat energy transferred from heat pipes 130 to second heat sink 150 may be transferred to bezel 160 and dissipated to the ambient air in both the passive and active mode of operation.

It will now be useful to describe various components of embodiments of such a cooling solution in more detail. FIGS.

4-11 provide greater detail into embodiments of hybrid cooling systems 100 and methods for managing the removal of heat energy mobile computing devices.

Figure 4:
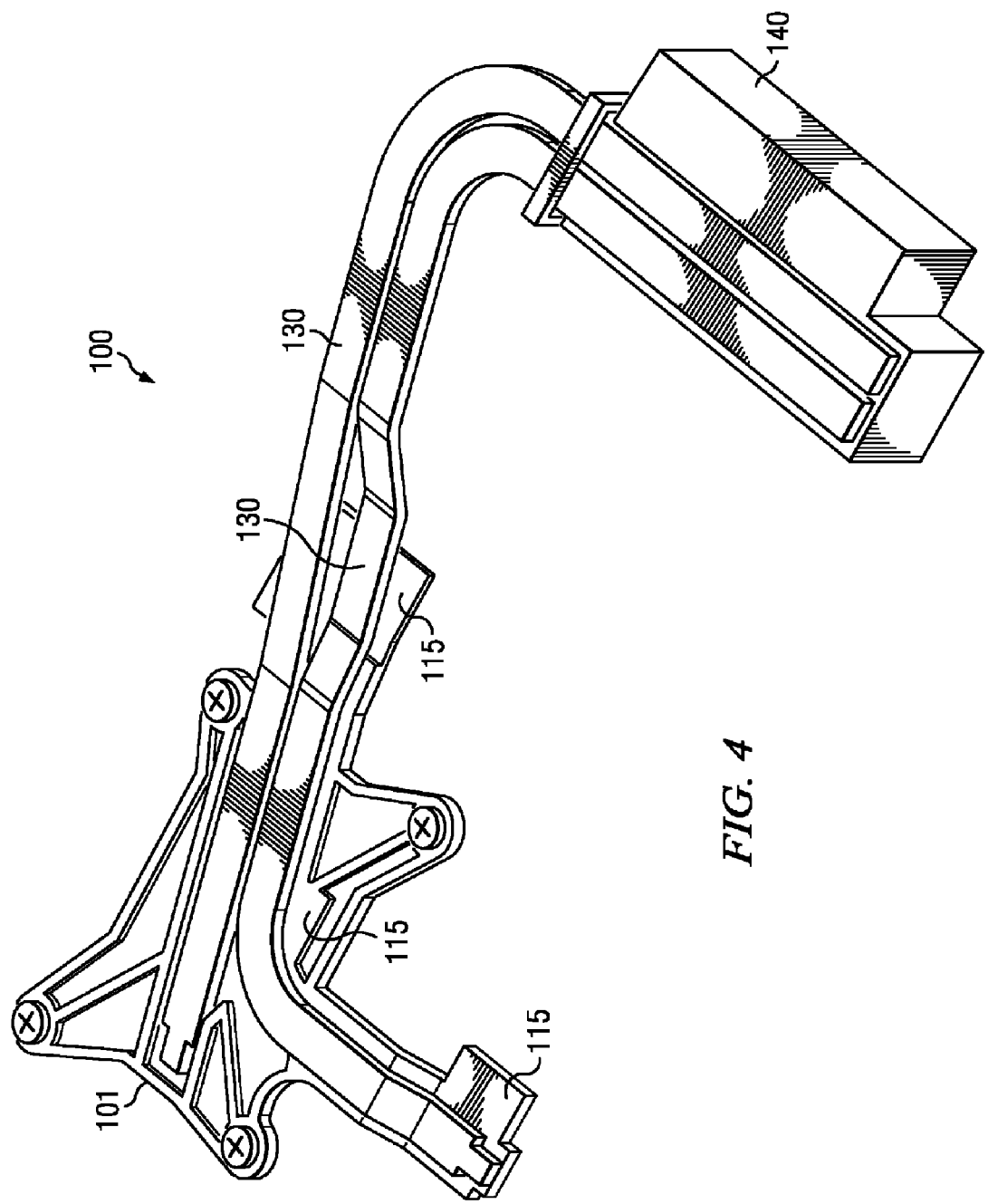
FIG. 4 is a partial perspective view of one embodiment of a passive portion of a hybrid cooling system.

FIG. 4 depicts a partial view of a portion of one embodiment of hybrid cooling system 100, including support structure 101, cold plates 115, heat pipes 130 and first heat sink 140. Support structure 101 may be configured and attached to mobile computing device 5 to ensure heat pipes 130 contact or are otherwise thermally coupled to selected electronic components 30. In some embodiments, cold plates 115 may be attached or integral to support structure 101 to provide greater contact area between electronic components 30 and heat pipes 130. A first cold plate 115 may be configured for contact with a first electronic component 30 (e.g., a CPU) and a second cold plate 115 may be configured for contact with a second electronic component (e.g., a GPU) to improve the heat transfer removal rate from electronic components 30. Two heat pipes 130 are depicted in FIG. 4, but those skilled in the art will appreciate that fewer or more heat pipes 130 may be positioned and configured to ensure heat energy is transferred from electronic components 30 to first heat sink 140. First heat sink 140 is configured to efficiently transfer heat energy from heat pipes 130 to the ambient air. First heat sink 140 may dissipate heat energy when hybrid cooling system 100 is in a passive mode of operation, and may transfer heat energy by dissipation and advection when hybrid cooling system 100 is in an active mode of operation.

Figure 5A:
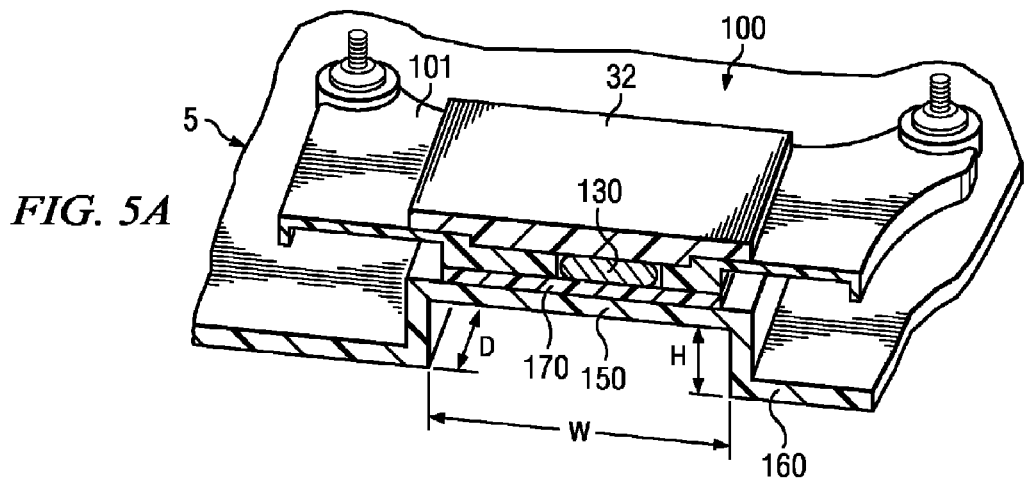
FIGS. 5A-5C are partial perspective views of embodiments of a hybrid cooling system.
Figure 5B:
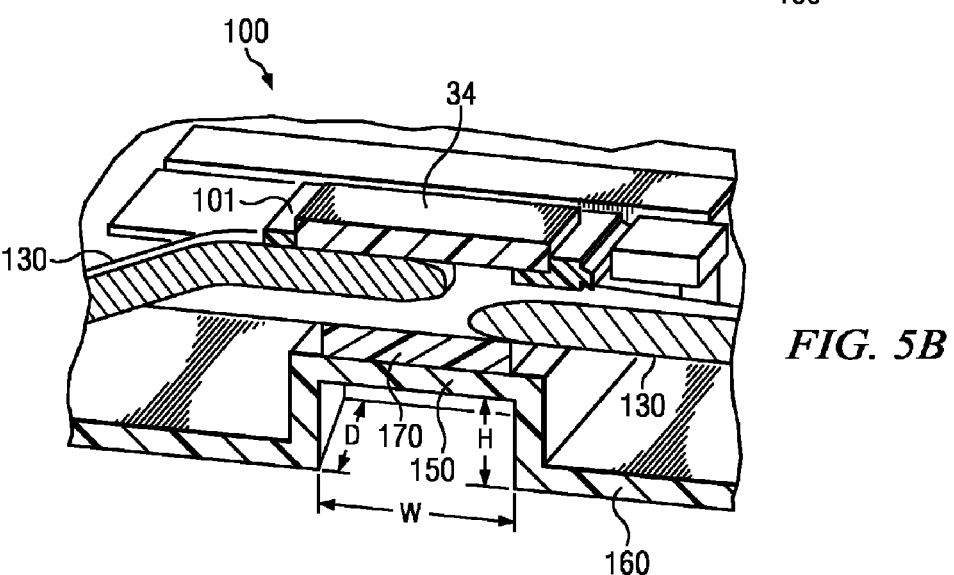
Figure 5C:
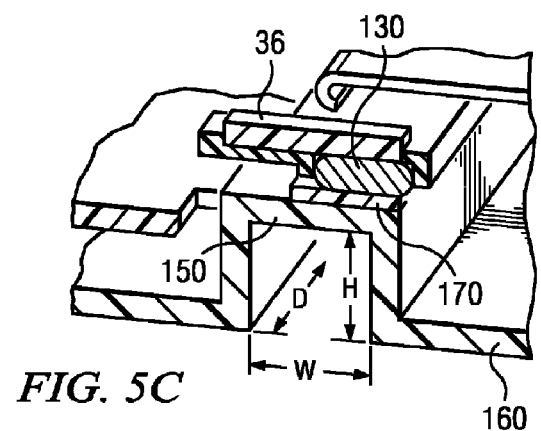
Figure 6A:
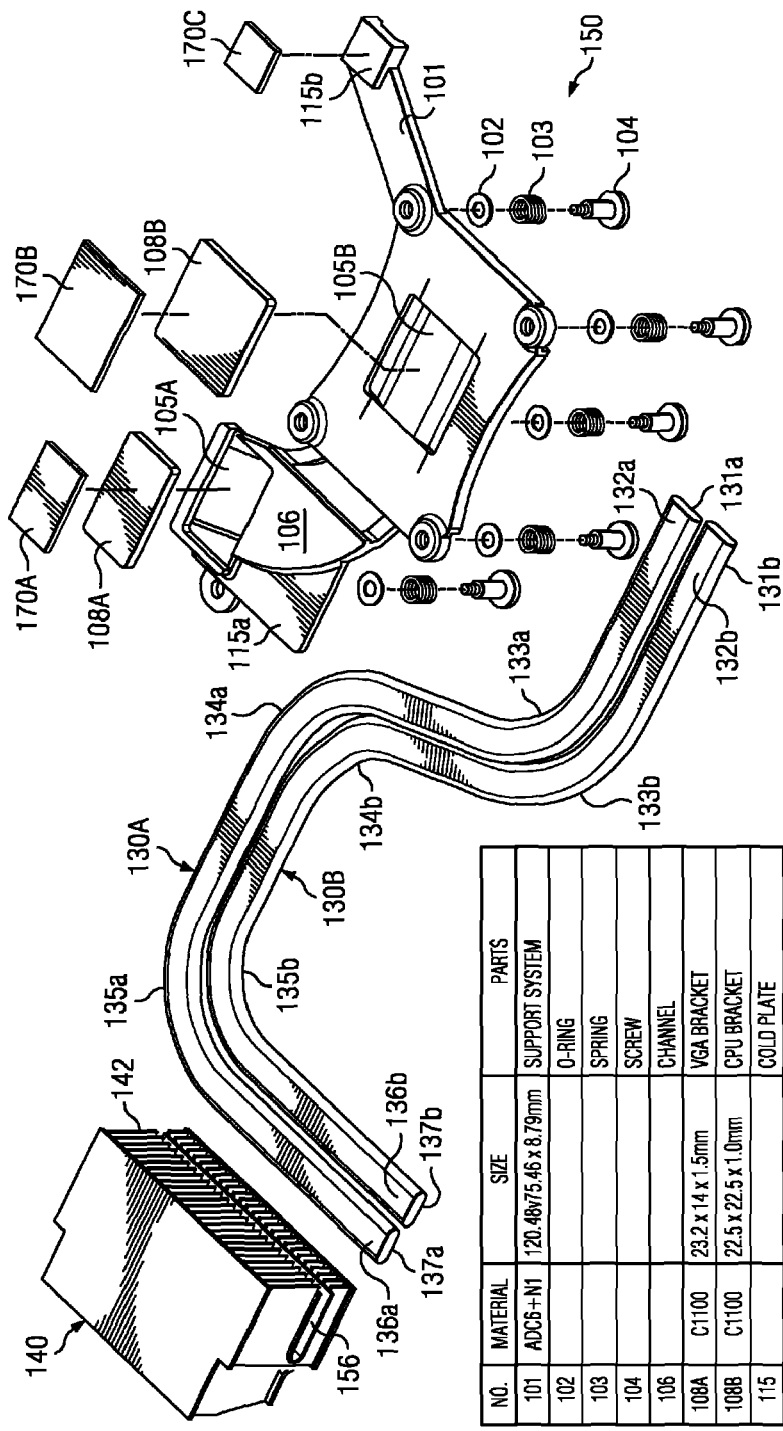
Figure 6B:
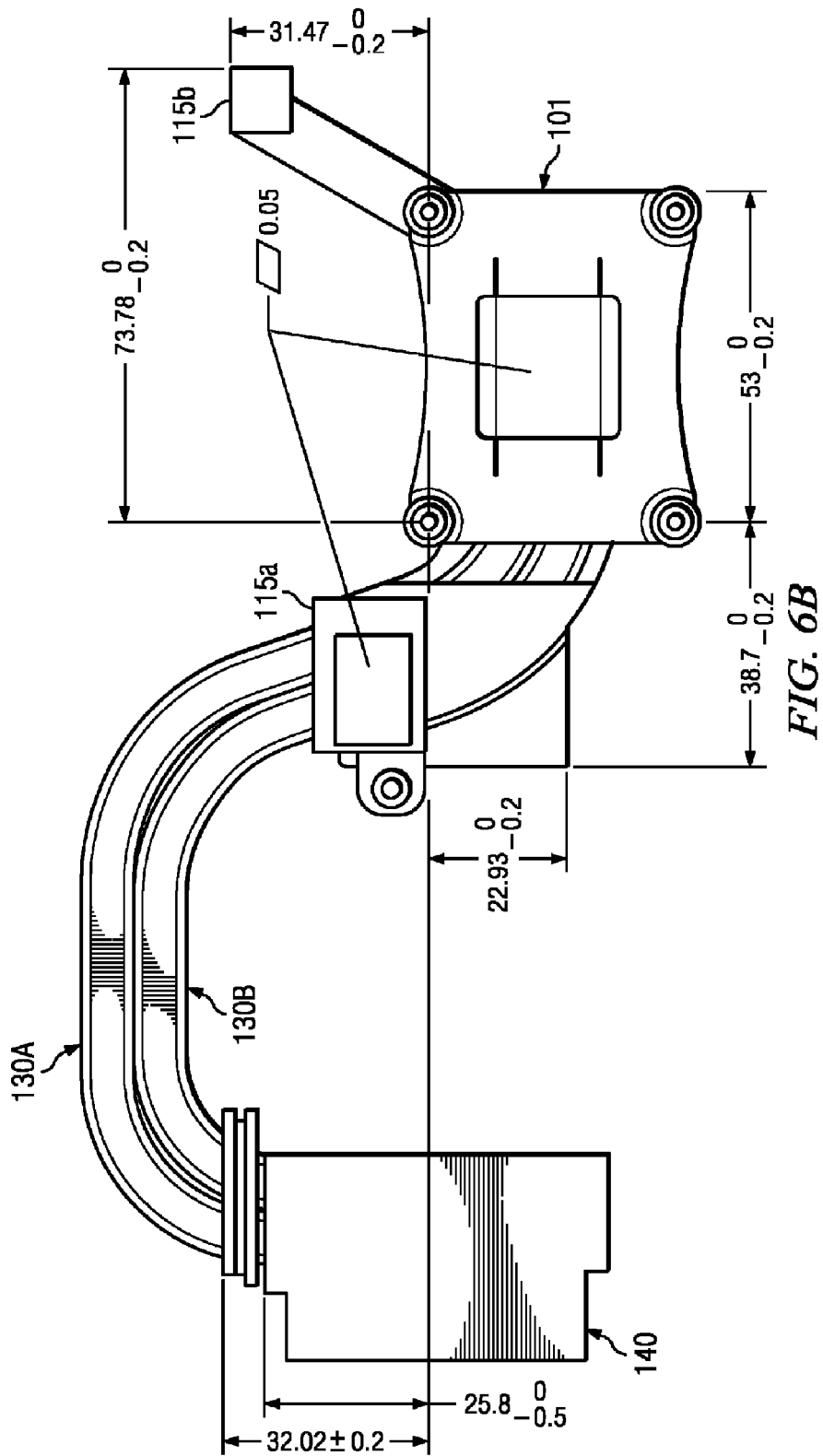
Figure 6D:
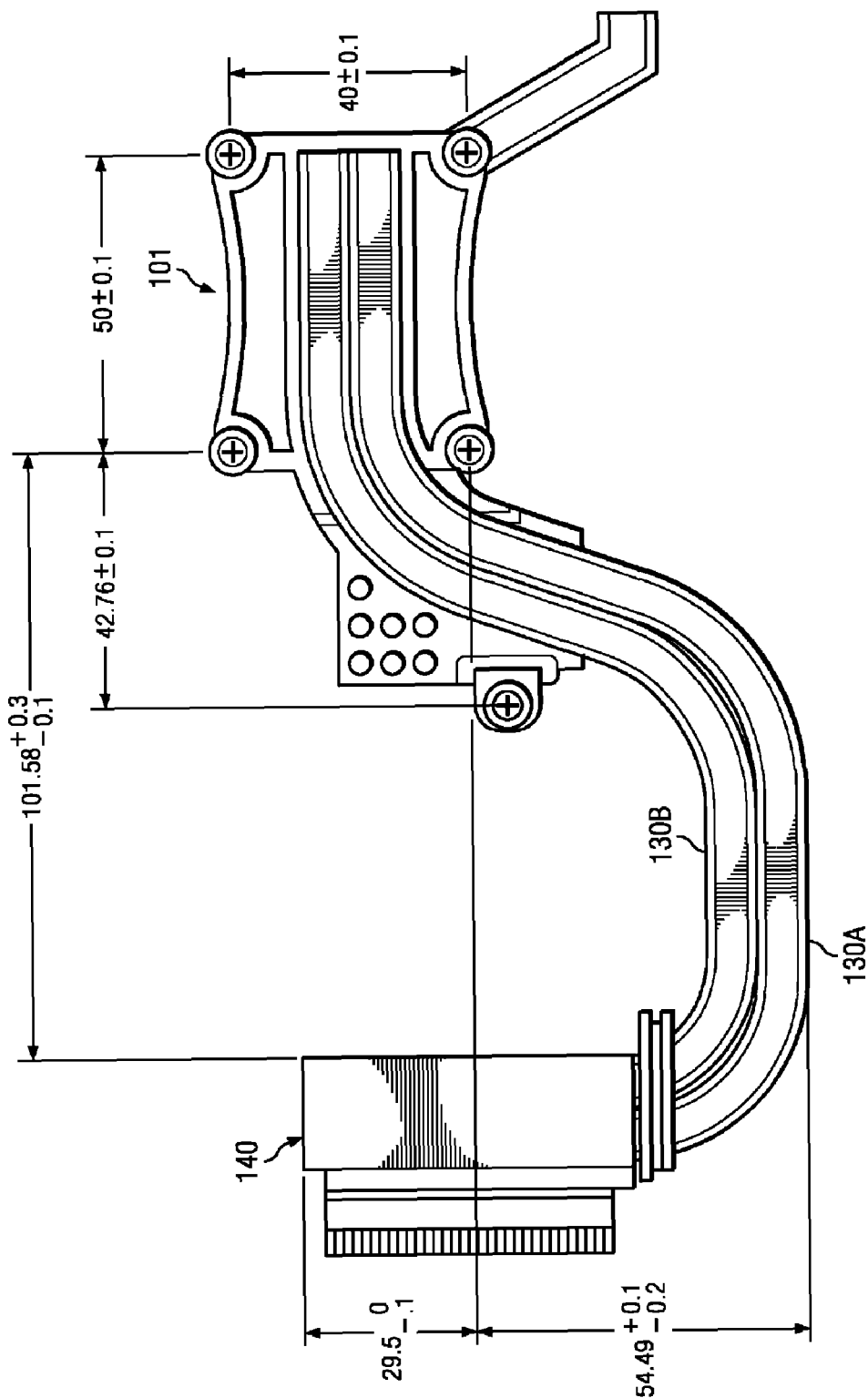

FIGS. 5A-5C depict partial cutaway views of mobile computing device 5 showing embodiments of hybrid cooling system 100. FIG. 5A depicts a partial cutaway view of mobile computing device 5 showing Central Processing Unit (CPU) 32 in contact with a single heat pipe 130 of hybrid cooling system 100. In some embodiments, support structure 101, thermally conductive pad 170 and second heat sink 150 may be configured to ensure CPU 32 is always in contact with or otherwise thermally coupled to heat pipe 130 and heat pipe 130 is in contact with or otherwise thermally coupled to second heat sink 150. The height (H), width (W) and depth (D) of second heat sink 150 may further be selected to optimize heat transfer from heat pipe 130 into the ambient air and to bezel 160.

FIG. 5B depicts a partial cutaway view of mobile computing device 5 showing Graphics Processing Unit (GPU) 34 in contact with two heat pipes 130 of hybrid cooling system 100. In some embodiments, support structure 101, thermally conductive pad 170 and second heat sink 150 may be configured to ensure GPU 34 is always in contact with or otherwise thermally coupled to heat pipes 130 and heat pipes 130 are in contact with or otherwise thermally coupled to second heat sink 150. The height (H), width (W) and depth (D) of second heat sink 150 may further be selected to optimize heat transfer based on a main or preferred heat pipe 130 or both heat pipes 130 into the ambient air and to bezel 160.

FIG. 5C depicts a partial cutaway view of mobile computing device 5 showing Memory Controller Hub (MCH) 36 in contact with one heat pipe 130 of hybrid cooling system 100. In some embodiments, support structure 101, thermally conductive pad 170 and second heat sink 150 may be configured to ensure MCH 36 is always in contact with or otherwise thermally coupled to heat pipe 130 and heat pipe 130 is in contact with or otherwise thermally coupled to second heat sink 150. The height (H), width (W) and depth (D) of second heat sink 150 may further be selected to optimize heat transfer from heat pipe 130 into the ambient air and to bezel 160.

As depicted in FIGS. 5A-5C, embodiments of hybrid cooling system 100 may utilize support structure 101 having different openings, brackets or other design features, one or more heat pipes 130, thermally conductive pads 170, second heat sink 150 of selected height, width and depth and bezel 160 to remove heat energy from electronic components 30. One or more heat pipes 130 may run parallel with electronic component 30, or a first heat pipe 130 may run along a first direction and a second heat pipe 130 may run along a second parallel, perpendicular or other direction relative to the first heat pipe 130. One or more second heat sinks 150 may be used based on components 30 inside mobile computing device 5. The height, width, depth, shape and number of heat transfer elements (e.g., fins, grids, etc) of second heat sink 150 may be based upon a number of factors, including the theoretical or empirical heat energy generated by a particular electronic component 30, the material or dimensions of bezel 160, the thermal conductivity of heat pipes 130, desired weight or dimensions of mobile computing device 5 or performance parameters of hybrid cooling system 100.

In some embodiments, thermally conductive pad 170 is selected to ensure desired thermal coupling between electronic components 30 and elements of hybrid cooling system 100, such as heat pipes 130 and heat sinks 140 and 150. Thermally conductive pad 170 may be selected for a desired thermal conductivity. In some embodiments, thermally conductive pad 170 is deformable to conform to electronic components 30. Gap Pad® VO Ultra Soft provides approximately 1.0 W/m-K of thermal conductivity, and Gap Pad® 1500S30 provides 1.3 W/m-K of thermal conductivity. Both are manufactured by The Berquist Company, Chanhassen, Minn. In one embodiment, thermally conductive pad 170 manufactured with a thickness of about 2 mm and a thermal conductivity of about 1 W/m–K or greater may be positioned between electronic component 30 and heat pipe 130 such that, when mobile computing device 5 is assembled with support structure 101, heat pipes 130, etc., the thickness of thermally conductive pad 170 is effectively reduced to about 1 mm to ensure constant contact and thermal coupling. An advantage to using thermally conductive pad 170 having a conformable, low hardness characteristic is that electronic component 30 is further dampened from vibration and shock forces when mobile computing device 5 is assembled. As mentioned above, mobile electronic devices may be used in military, police, or other intense situations or harsh environments, and any vibration dampening or shock absorbing effect in addition to heat transfer is an additional benefit not accounted for in traditional cooling systems.

FIGS. 6A-6G depict an exploded view and partial views of one embodiment of support structure 101 that may be used in conjunction with hybrid cooling system 100. As depicted in FIGS. 6A-6G, support structure 101 may include hardware such as o-rings 102, springs 103 and screws 104 for attaching support structure 101 to chassis 5, with openings 105 (e.g., 105a, 105b), brackets 108, thermally conductive pads 170 to ensure contact or otherwise thermal coupling between electronic components 30 and heat pipes 130, and also including cold plates 115, one or more heat pipes 130, such as heat pipes 130A and 130B, and first heat sink 140. Accordingly, support structure 101 may have one or more integrally formed mounting points constructed to allow support structure 101 to be mechanically coupled to a printed circuit board or chassis 15. The location of these mounting points may be based upon the printed circuit board with which support structure 101 is intended for use, the location of electronic components on the printed circuit board or any of a number of other factors, including manufacturing, design or operational factors. In one embodiment, mounting points may be constructed to be utilized with torque limiting screws 104 intended to be mechanically coupled to the printed circuit board with which support structure 101 is intended for use.

In some embodiments, support structure 101 may be constructed to be utilized in conjunction with a particular type of printed circuit board having one or more electronic components 30 which are to be cooled by hybrid cooling system 100. This type of printed circuit board may for example be a motherboard (for example, a Dell manufactured motherboard such as Dell part number WM402) for mobile computing device 5 having one or more microprocessors and associated Application-Specific Integrated Circuit (ASIC) (for example, a Dual Core Intel Centrino microprocessor and associated Northbridge and Southbridge ASIC's). Thus, support structure 101 may further include openings 105 or brackets 108 for access to electronic components 30.

Cold plates 115 may be configured from a selected material, having a selected form or weight, and positioned to increase the heat transfer rate between electronic components 30 and heat pipes 130. Additionally, the configuration of one or more cold plates 115 may advantageously provide dampening to protect electronic components 30 from shock forces if mobile computing device 10 is dropped or used under intense conditions or in a harsh environment.

Cold plates 115 may be constructed to be coupled to a corresponding electronic component 30 on the printed circuit board to which support structure 101 is coupled. Cold plates 115 may be constructed of a thermally conductive material, and may be integrally formed with support structure 101 or may be separately formed and disposed within an opening formed (either partially or wholly) within a portion of support structure 101. In some embodiments, support structure 101 may be composed of aluminum or an aluminum alloy. In some embodiments, a first cold plate 115a may be formed for use with a microprocessor (e.g., CPU 32) which may have a first heat generation rate and a second cold plate 115b may be formed for use with a microprocessor (e.g., GPU 34) which may have a second heat generation rate. In some embodiments, cold plates 115 may therefore by constructed of copper and disposed within an opening formed in support structure 101 and may be mechanically or thermally coupled to support structure 101 at one or more contact points.

Each of cold plates 115 is also thermally coupled to one or more of the heat pipes 130 of support structure 101. Specifically, in one embodiment, support structure 101 is constructed with one or more channels 106 through which heat pipes 130 are routed. Each of these channels 106 may be constructed such that each cold plate 115 helps form, or is contacted by, a portion of channel 106. Channels 106 may be constructed to mechanically couple to heat pipe 130 so that heat pipe 130 may be routed through channels 106 such that heat pipe 130 may be thermally or mechanically coupled to one or more of the cold plates 115 which may partially (or wholly) form, or be contacted by, channel 106 through which it is routed.

Heat pipe 130 disposed within mobile computing device 5 may be configured with electronic component contact areas for contact with electronic components 30. In some embodiments, top electronic component contact area 131 (e.g. 131a, 131b) or bottom electronic component contact area 132 (e.g. 132a, 132 b) may be configured for contact with a Central Processing Unit (CPU) microprocessor, a Graphics Processing Unit (GPU), a memory, or some other electronic component that generates heat during normal operations. In some embodiments, configuring electronic component contact area 131 or 132 for contact with an electronic component 30 may involve flattening a portion of heat pipe 130.

In some embodiments, heat pipes 130 may be configured having curves 133, 134 and 135 (e.g. 133a, 133b, 134a, 134b, 135a, 135b) for routing heat transfer around electronic components 30 or to ensure contact with electronic components 30. Heat pipes 130 may lie in one plane, or may have multiple bends in various directions such that heat pipes 130 contact selected electronic components 30 or avoid selected electronic components 30. In one embodiment, heat pipes 130 may be constructed to include having curves 133, 134 and 135 such that the curvature of heat pipe 130 is constructed to allow heat pipe 130 to be routed to provide a desired amount of contact between heat pipe 130 and heat sink 140. The radius of curves 133, 134 or 135 may depend on a wide variety of factors, including manufacturability factors related to heat pipe 130. FIG. 6 depicts an embodiment having two heat pipes, referred to as 130 and 130b. In some embodiments, only a single heat pipe 130 is included in hybrid cooling system 100, in other embodiments two or more heat pipes are included in hybrid cooling system 100. Also, first heat pipe 130a may have curves 133a, 134a and 135a with associated radii of curvature and second heat pipe 130b may have fewer or more curves 133b, 134b and 135b with the same or different radii of curvature to ensure a desired heat transfer rate is achieved in a passive mode of operation.

Heat pipe 130 disposed within mobile computing device 5 may further include heat sink contact areas 136 or 137 for contact with surface 142 of first heat sink 140. In some embodiments, configuring heat pipe 130a or 130b for contact with heat sink 140 may involve flattening a portion of heat pipe 130a or 130b such that heat sink contact area 136a, 136b, 137a or 137b has a larger surface area.

An advantage to having multiple heat pipes 130 in contact with or otherwise thermally coupled to electronic components 30 and first heat sink 140 and second heat sink 150 in contact with or otherwise thermally coupled to heat pipes 130 is that heat energy is transferred from electronic components efficiently such that the size of first heat sink 140 may be reduced. Advantageously, reducing the size of first heat sink 140 may decrease the overall weight of mobile computing device or decrease the cooling area on the outside of mobile computing device 5 (i.e., the "footprint" of the exhaust vent) such that additional components, including I/O doors, plugs, ports, or other peripheral mechanisms may be added to improve the capabilities or performance of mobile computing device 5.

FIGS. 7A-7F depict bottom and partial cutaway views of one embodiment of bezel 160 having vent 144 for air flow device 145 and a plurality of second heat sinks 150. In some embodiments, a single second heat sink 150 may be utilized to ensure that heat energy generated by electronic components 30 may be dissipated to the environment. A disadvantage to having a single second heat sink 150 may be that, if there are two or more electronic components and the electronic components generate heat energy at a different rate, heat energy may be transferred from one electronic component to a second electronic component. For example, a Graphics Processing Unit (GPU) and a Dual Inline Memory Module (DIMM) may be positioned close or proximate each other in mobile computing device 5. GPU 32 may perform a significant amount of processing and therefore generate a large amount of associated heat energy. DIMM 38 may not involve significant processing and therefore may generate significantly less heat energy. If second heat sink 150 is thermally coupled to both, there is the possibility that heat generated by GPU 32 will be transferred to DIMM 38, thus negatively affecting the memory in mobile computing device 5. To avoid this and similar concerns, in some embodiments, although a single heat sink 150 may be utilized, second heat sink 150 may include a gap, an insert or some other thermal isolation mechanism to ensure GPU 32 is thermally isolated from DIMM 38. In some embodiments, mobile computing device 5 may be configured with multiple second heat sinks 150, with each second heat sink 150 configured based on characteristics of a particular electronic component. For example, second heat sink 150a depicted in FIGS. 7B and 7C may be configured based on a CPU and second heat sink 150b depicted in FIGS. 7B and 7D may be configured based on characteristics of a memory component.

Referring to FIGS. 7B-7E, second heat sinks 150a and 150b may be configured having array 156a or 156b of fins 157 to aid in convection cooling. Array 156a or 156b of fins 157 may be oriented in parallel rows or columns, may intersect to form a grid, may be arranged as a honeycomb or any other configuration that allows convection cooling. In some embodiments, second heat sinks 150a and 150b having array 156a or 156b of fins 157 in a grid layout provide an additional and beneficial support to electronic components in mobile computing device 5. Those skilled in the art will appreciate that by adjusting one or more of the height (e.g., $h_a$ for second heat sink 150a, $h_b$ for second heat sink 150b, etc), width ($w_a$ for second heat sink 150a, $w_b$ for second heat sink 150b, etc), depth ($d_a$ for second heat sink 150a, $d_b$ for second heat sink 150b, etc), thickness ($t_a$ for second heat sink 150a, $t_b$ for second heat sink 150b, etc) or the geometry of array 156a or 156b, the weight, ruggedness, or some other characteristic of mobile computing device 5 may pass a particular standard or suit a particular need in addition to the cooling capacity of hybrid cooling system 100. Array 156 of second heat sink 150 may further be configured based on a desired case strength, drop resistance, a maximum weight of mobile computing device 5, operating environment, or some combination.

Figure 7A:
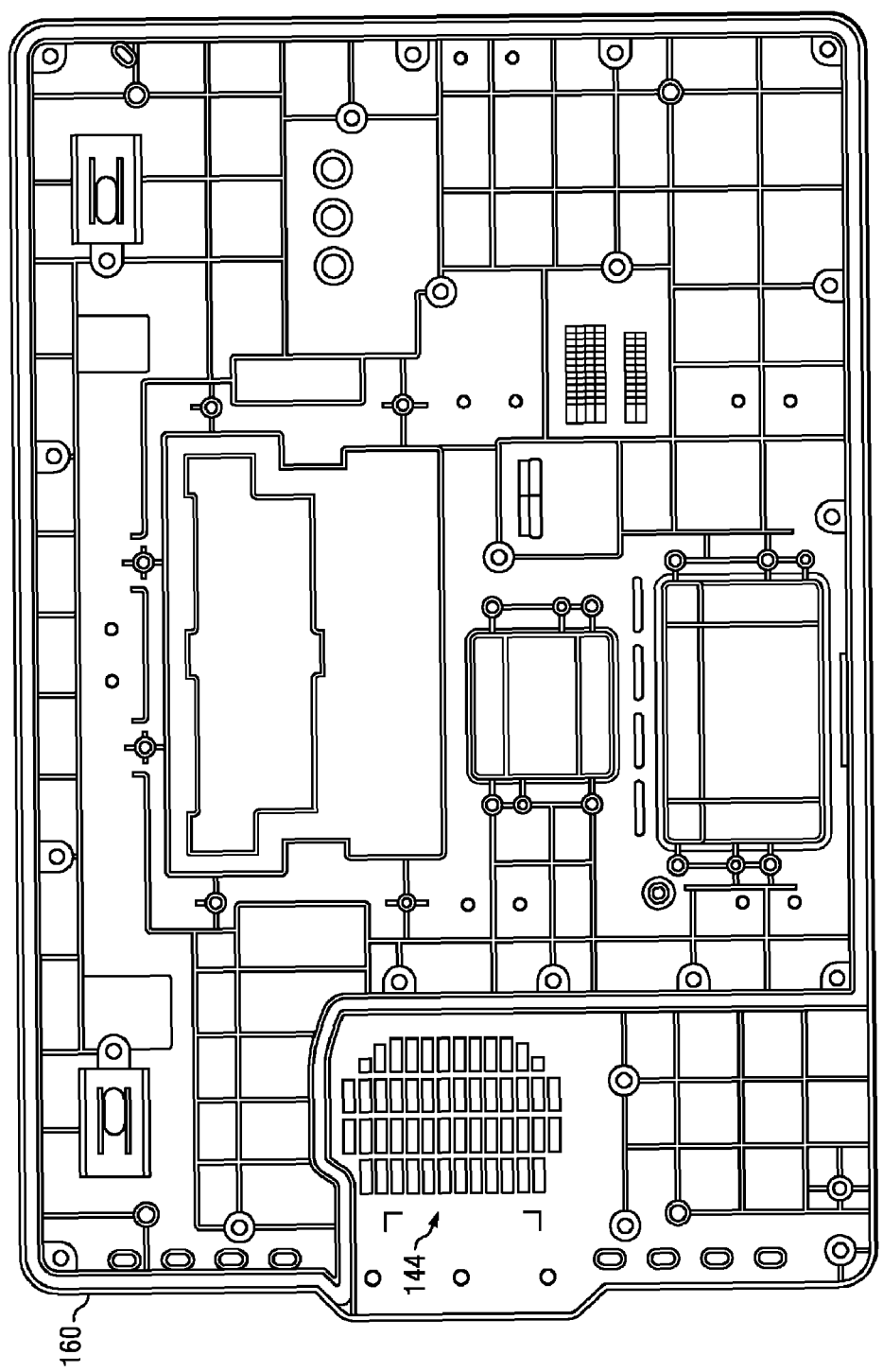
Figure 7E:
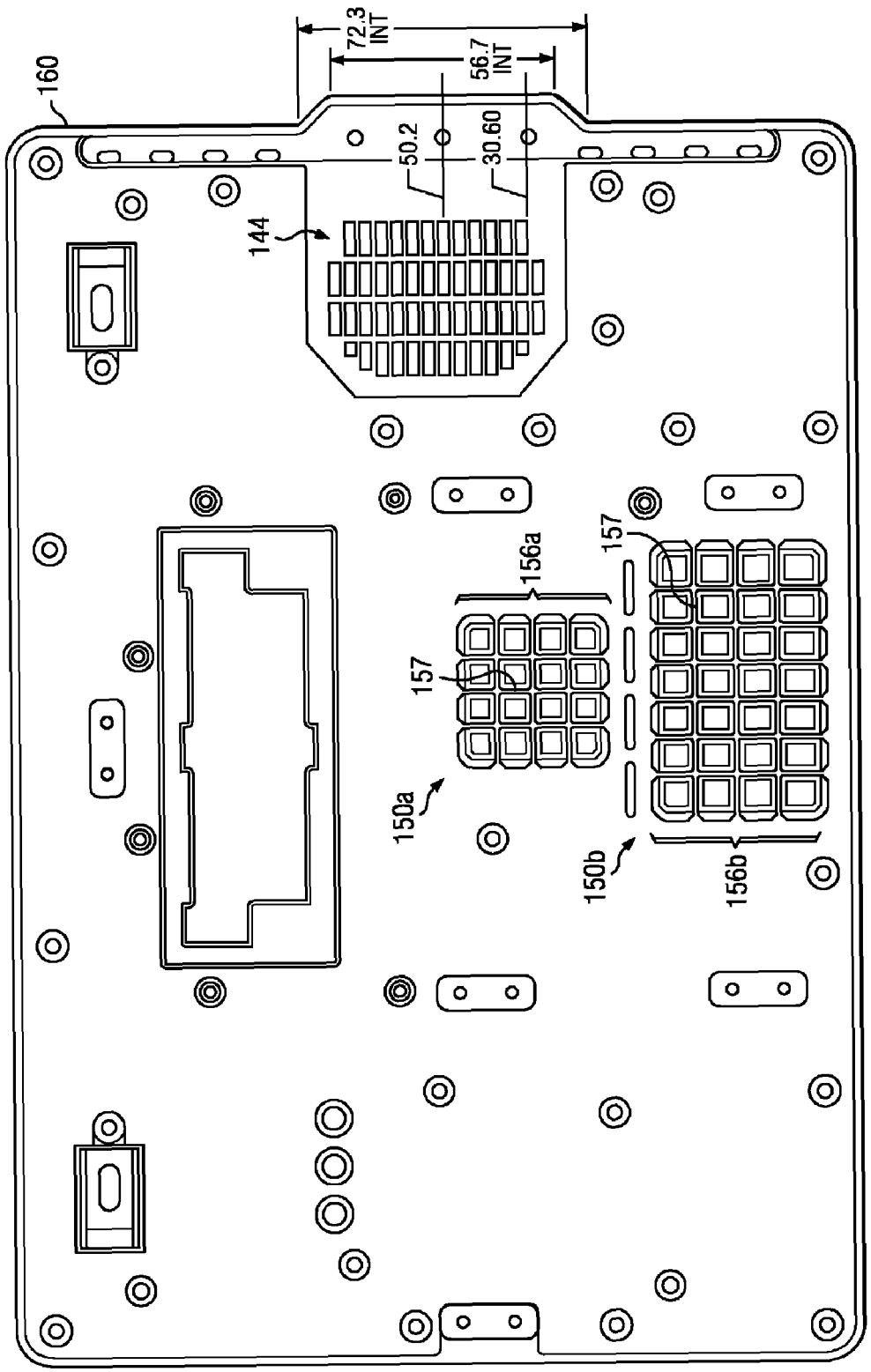
Figure 7F:
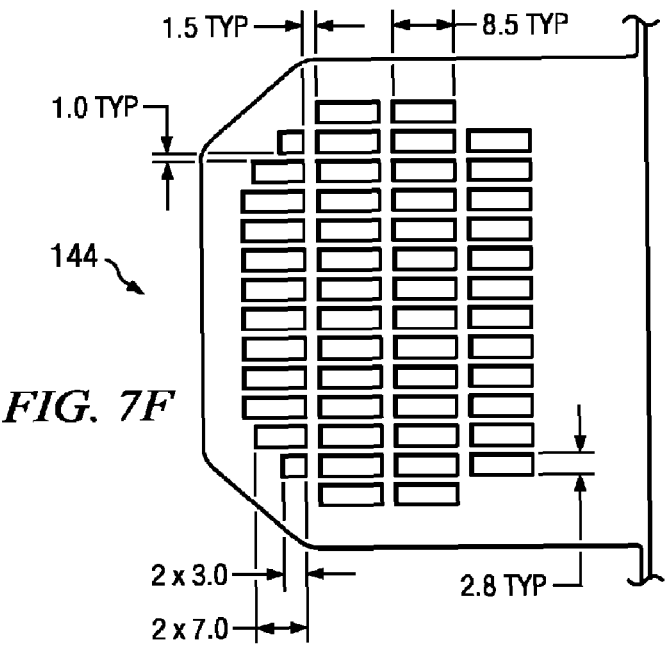

FIGS. 7E and 7F depict bottom and partial bottom views, respectively, of bezel 160 for use with mobile computing device 5. FIG. 7E depicts second heat sinks 150a and 150b formed with array 156a or 156b of fins in a grid. FIGS. 7E and 7F further depict one embodiment of intake vent 144 configured and positioned in bezel 160 relative to air flow device 145. When hybrid cooling system 100 is operating in a passive or active cooling mode, ambient air is able to flow up through intake vent 144 into air flow device 145 such that convective cooling is facilitated.

Embodiments of hybrid cooling system 100 may operate in a passive mode or an active mode. In a passive cooling mode of operation, heat energy generated by electronic components of mobile computing device 5 may be removed from electronic components 30 using dissipation. In some embodiments, passive cooling of electronic components 30 may involve heat transfer from electronic components 30 to first heat sink 140 or second heat sink 150. Heat transfer may be accomplished by heat pipes 130. Passive cooling may further involve dissipating heat from first heat sink 140 or second heat sink 150 to the surrounding environment.

During operation, electronic component 30 may generate heat energy at various heat generation rates, depending on the operating system, hardware, applications running, display modes, and communications. Electronic components 30 may generate heat at a first heat generation rate corresponding to a desired operating system and display mode.

Hybrid cooling system 100 may remove heat from electronic components 30 at a first heat removal rate, and may further transfer heat to the environment at a first heat exhaust rate. As long as the first heat removal rate and the first heat exhaust rate exceed the first heat generation rate, hybrid cooling system 100 may operate in a passive cooling mode only. Advantageously, some embodiments disclosed herein are operable to continuously operate in a passive cooling mode when the ambient air is at or below 25 degrees Celsius and the CPU usage is at or below 50% max.

In one embodiment, a passive cooling mode of a hybrid cooling method comprises thermally coupling first heat sink 140 and second heat sink 150 to electronic component 30 that generates heat at a first heat generation rate, such that substantially all generated heat is easily transferred from electronic component 30 via first heat sink 140 at a first heat removal rate and via second heat sink 150 at a second heat removal rate, and further transferred to the ambient air at the first heat exhaust rate. When the first desired heat removal rate, the second desired heat removal rate and the first heat exhaust rate exceed the heat generation rate, mobile computing device 5 may operate continuously in a passive cooling mode. Operating in a passive cooling mode may result in lower noise because air flow device is not forcing air across fins 142, etc. Operating in a passive cooling mode may result in longer battery charge because air flow device 145 is not drawing current. Operating in a passive cooling mode may result in increased reliability because air flow device 145 is not operating. Furthermore, mobile computing device 5 may operate without throttling or other associated reductions in performance.

As mentioned above, controller 60 may activate or deactivate air flow device 145 in response to a predetermined condition. A predetermined condition may be based on the performance of mobile computing device, on a temperature of a particular electronic component, on a sensed temperature inside chassis, on the available power, on a heat removal rate calculated from sensed temperatures, on the a heat exhaust rate calculated from sensed temperatures, or the like. For example, in some situations or environments, the heat energy generated by electronic components 30 may force the heat generation rate of chassis 15 to exceed either the first heat removal rate or the first heat exhaust rate. In response to determining the heat generation rate exceeds the first heat removal rate or the heat exhaust rate, controller 60 may activate air flow device 145.

As another example, a predetermined condition may be a temperature above which damage may occur to electronic components, reliability may be decreased, throttling may be initiated, mobile computing device 5 may be shut down, or some other performance or reliability parameter. Controller 60 may monitor temperatures and, if the temperature exceeds a temperature, activate air flow device 145. A predetermined condition may also be affected by battery power or some user defined parameter. In one embodiment, a user may indicate that no air flow device 145 is to be used. In this embodiment, controller 60 may ensure air flow device 145 remains off and mobile computing device 5 may utilize some other mechanism (e.g., throttling, limited graphics, running only applications defined as critical, etc) to maintain mobile computing capabilities.

In some embodiments, if controller 60 determines that a threshold temperature or condition exists, controller 60 may activate fans to implement active cooling portions such that heat may be transferred at a second heat removal rate or a second heat exhaust rate. FIGS. 8A-8C depict bottom, side and top views of air flow device 145 in accordance with one embodiment of the present invention. As depicted in FIGS. 8A-8C, air flow device 145 may be a blower, with air entering air flow device 145 from intake vent 144 on bezel 160. Air flow device 145 may have fins 142 for accelerating the air such that the air has a desired flow rate at exhaust 147. Air flow device 145 may be manufactured to operate at a desired power level (e.g., 5 V constant voltage) to generate a desired flow rate (e.g., greater than 9 cubic feet per minute), at a desired noise level (e.g., less than 65 dB based on ISO7779 in semi-anechoic chamber with background noise 16 dB with microphone positioned 1 m from the air intake, testing in clean air), to withstand drop shock (e.g., withstand drops on any three faces from a height of 30 cm onto a wood board 10 mm thick), withstand a locked rotor condition, operate within a desired temperature range (e.g., −10 degrees C. to +70 degrees C.) or the like.

Figure 9:
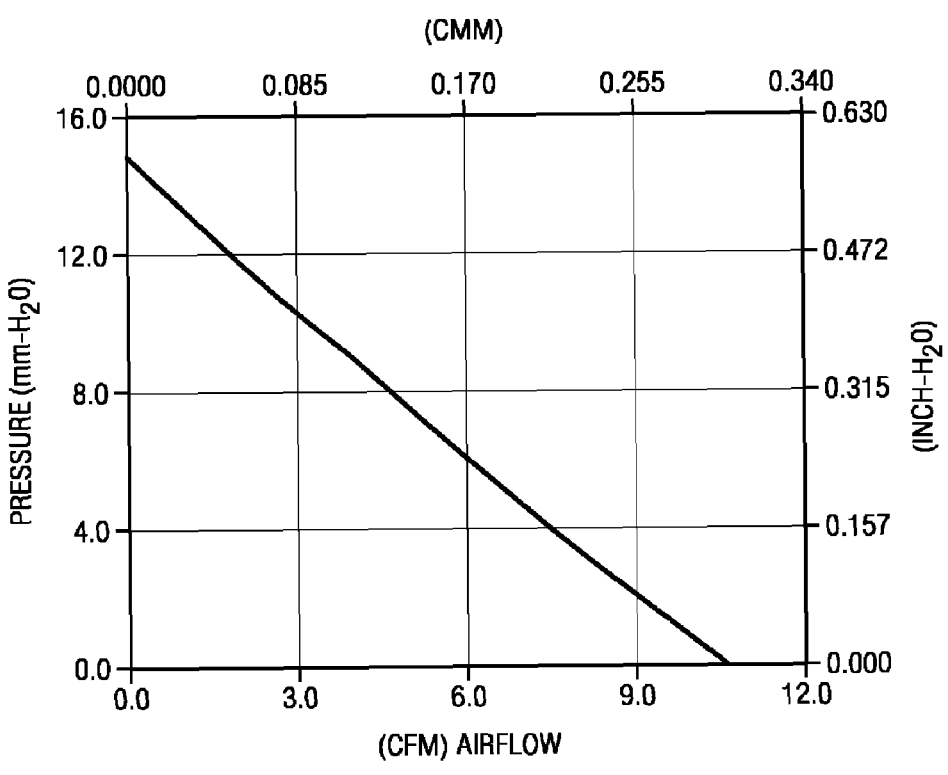
FIG. 9 depicts a graph of the performance of an air flow device such as depicted in FIGS. 8A-8C.

FIG. 9 depicts a performance chart for the embodiment of air flow device depicted in FIGS. 8A-8C. As depicted in FIG. 9, air flow device 145, operating at 5000 RPM at 5 V constant voltage may generate a flow rate between 9 and 12 cubic feet per minute (CFM). In some embodiments, controller 60 may store information about the performance chart associated with air flow device 145 and may adjust the RPM of air flow device 145 to achieve a desired cooling rate or power usage. In some embodiments, controller 60 may store a threshold temperature above which air flow device 145 is operated to produce the maximum air flow rate.

During an active mode of a hybrid cooling method, heat from the operation of electronic components 30 is transferred to heat pipe 130. By operation of heat pipe 130 the heat is then transferred to first heat sink 140. Air flow device 145 operates to take in air through vents formed in bottom 144 of bezel 160 and move this air through heat sink 140 and out into ambient air, thereby cooling heat sink 140 and consequently removing heat from mobile computing device 5. In this manner, hybrid cooling system 100 may efficiently remove heat from one or more electronic components which may be critical to the operation of mobile computing device 200 and evacuate the heat from the mobile computing device 200 allowing use of higher speed electronic components, increased thermal performance of the mobile computing device and the commensurate gains in performance of electronic components and temperature tolerance.

In some embodiments, hybrid cooling system 100 is designed to minimize the number of times an active portion is initiated. For example, hybrid cooling system 100 may be designed, assembled or operated such that in settings in which the ambient air temperature is less than 25 degrees Celsius, a passive portion operating individually sufficiently cools the electronic components, or that in settings in which the ambient air temperature is less than 60 degrees Celsius, passive cooling portion 110 sufficiently cools the electronic components such that active cooling portion 120 is used a limited amount (e.g., less than 10% of the time, a fan operates at 3000 rpm or lower, etc.) and electronic components 30 are not throttled, shut down, etc.

Figure 10:
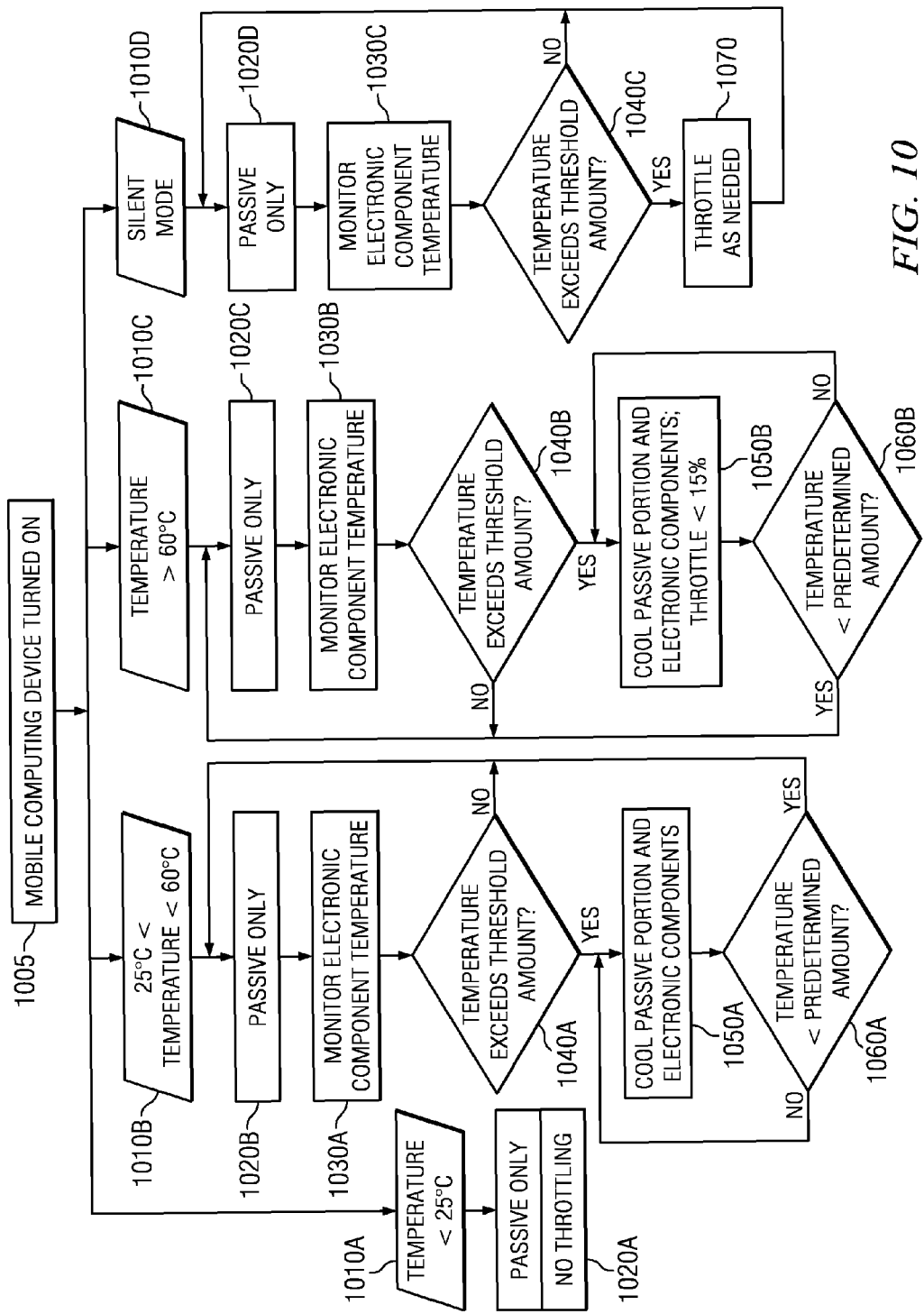
FIG. 10 is a flow chart depicting modes of operation for one embodiment of a hybrid cooling system.

FIG. 10 depicts a diagram depicting modes of operation for embodiments of hybrid cooling system 100. By providing multiple modes of operation, hybrid cooling system 100 allows users and controller 60 to efficiently manage the heat buildup in mobile computing device 5 to improve reliability, reduce noise and increase battery life.

In step 1005, mobile computing device 5 is turned on, which may automatically initiate selected applications, operating systems, etc. Particularly if mobile computing device 5 has been turned off for some period of time, the temperature of electronic components will be at room temperature (about 23 degrees Celsius). Initiating operating systems, opening applications and establishing connectivity with networks may generally be accomplished in under five minutes. Thus, embodiments of mobile computing device 5 may take about five minutes to reach a base steady state. When mobile computing device 5 reaches a base steady state, controller 60 is operable to control hybrid cooling system 100 in four different modes based on one or more parameters.

In a first mode 1010A, hybrid cooling system 100 is operable to cool mobile computing device 5 using only passive cooling portion 20, without any throttling, at any processor speed and at temperature less than about 25 degrees Celsius.

In a second mode 10108, hybrid cooling system 100 cools mobile computing device 5 using passive and active cooling. At step 1020B, hybrid cooling system 100 is operating in a passive mode. At lower temperatures (e.g., closer to 25 degrees Celsius) and lower electronic component operating temperatures (e.g., a user or users are operating CPU 32 at less than 35% of maximum), hybrid cooling system 100 may still be operable to cool using only passive portion 20. However, as the ambient air temperature increases or the electronic component operating speed increases, the likelihood that active portion 120 will be activated increases.

In step 1030A, controller 60 monitors electronic components 30. Monitoring electronic components 30 may be accomplished by directly monitoring a temperature sensor associated with a particular electronic component 30 (e.g., a CPU 32), may be accomplished by monitoring a temperature sensor mounted in chassis 15 of mobile computing device 5 and then inferring a temperature associated with electronic component 30, or may be accomplished by monitoring a parameter of a particular electronic component (e.g., monitoring CPU speed) and determining a temperature based on the parameter (e.g., correlating a change in the CPU speed to a CPU temperature).

At step 1040A, controller 60 determines if the temperature of electronic components 30 exceeds a threshold temperature. If the threshold temperature is not exceeded, hybrid cooling system 100 continues to operate in passive mode 1020B and continues monitoring electronic components 30 in step 1030A. If the threshold temperature is exceeded, controller 60 may activate air flow device 145 to initiate an active cooling mode of hybrid cooling system 100.

At step 1050A, controller 60 activates air flow device 145 to cool heat pipes 130 and other components of passive portion 20 of hybrid cooling system 100 as well as electronic components 30. In some embodiments, activating air flow device 145 may cool first heat sink 140 to a temperature until fins 142 or other heat transfer mechanisms are not heat saturated, may cool heat pipes 130 up to the point that heat pipes operate in a more efficient temperature range, or until passive portion 20 of hybrid cooling system 100 otherwise operates efficiently.

At step 1060A, controller 60 checks whether the temperature of electronic components 30 is less than a predetermined temperature. In some embodiments, the predetermined temperature may be a temperature that is less than the temperature used by controller 60 to activate air flow device 145. In some embodiments, controller 60 may determine whether mobile computing device 5 is on battery power is supplied or if external power is supplied, and deactivate air flow device 145 based in part on the power. Thus, if only battery power is supplied, controller 60 may use a higher temperature, such that air flow device 145 is deactivated earlier to save battery power, while if external power is supplied, controller 60 may run air flow device 145 longer to provide optimal cooling of electronic components 30. Other factors, including applications running, hardware installed, or user preferences may also help controller 60 determine whether to deactivate air flow device 145.

If controller 60 determines that the temperature of electronic components 30 is still greater than a predetermined temperature, air flow device 145 continues to operate. In the alternative, if controller 60 determines that the temperature of electronic devices 30 is at or below a predetermined temperature, controller may deactivate air flow device 145 such that hybrid cooling system 100 returns to a passive mode of operation. Deactivating air flow device may refer to immediately removing power from air flow device (e.g., 5000 RPM initially, 0 RPM), to stepping down the power (e.g. 5000 RPM initially, 2500 RPM for 1 minute, then 0 RPM), or to gradually removing power (e.g., 5000 RPM initially, decreasing by 2500 RPM per minute) or some combination.

It should be noted that for all ambient temperatures less than 60 degrees Celsius and all electronic component operating speeds, hybrid cooling system 100, using both passive cooling portion 110 and active cooling portion 120, is able to cool electronic components 30 such that no throttling or shut down is required.

In a third mode 1010C at ambient air temperatures greater than 60 degrees Celsius, hybrid cooling system 100 is able to cool electronic components 30 with some throttling. However, throttling electronic components is ideally restricted to less than about 15% such that processing speeds remain about 85% or greater of the maximum processing speeds.

At step 1020C, hybrid cooling system 100 is operating in a passive mode. At lower temperatures (e.g., closer to 60 degrees Celsius) and lower electronic component operating temperatures (e.g., CPU 32 is idling or operating less than 15% of max), hybrid cooling system 100 is able to operate using primarily passive portion 20. However, as the ambient air temperature increases or the electronic component operating speed increases, the frequency or duration that active portion 120 is activated may increase. Furthermore, to assist hybrid cooling system 100 with cooling, electronic components 30 may be throttled up to 15% (i.e., electronic components 30 may still operate at 85% or greater max operating speed).

In step 10308, controller 60 monitors electronic components 30. Monitoring electronic components may be accomplished by directly monitoring a temperature sensor associated with a particular electronic component 30 (e.g., CPU 32), may be accomplished by monitoring a temperature sensor mounted in chassis 15 of mobile computing device 5 and then inferring a temperature associated with electronic component 30, or may be accomplished by monitoring a parameter of a particular electronic component (e.g., monitoring CPU speed) and determining a temperature based on the parameter (e.g., correlating a change in the CPU speed to a CPU temperature).

At step 1040B, controller 60 determines if the temperature of electronic components 30 exceeds a threshold amount. If the threshold temperature is not exceeded, hybrid cooling system 100 continues to operate in passive mode 1020C and continues monitoring electronic components 30 in step 1030B. If the threshold temperature is exceeded, controller 60 may activate air flow device 145 to initiate an active cooling mode of hybrid cooling system 100.

At step 1050B, controller 60 activates active cooling portion 120 of hybrid cooling system 100, such as by supplying power to air flow device 145 to increase heat transfer via first heat sink 140. In some embodiments, activating air flow device 145 may cool first heat sink 140 to a temperature until fins 142 or other heat transfer mechanisms are not heat saturated, may cool heat pipes 130 up to the point that heat pipes operate in a more efficient temperature range, or until passive cooling portion 110 of hybrid cooling system 100 otherwise operates efficiently.

At step 1060B, controller 60 checks whether the temperature of electronic components 30 is less than a predetermined temperature. In some embodiments, the predetermined temperature may be a temperature that is less than the temperature used by controller 60 to activate air flow device 145. In some embodiments, controller 60 may determine whether mobile computing device 5 is on battery power is supplied or if external power is supplied, and deactivate air flow device 145 based in part on the power. Thus, if only battery power is supplied, controller 60 may use a higher temperature, such that air flow device 145 is deactivated earlier to save battery power, while if external power is supplied, controller 60 may run air flow device 145 longer to provide optimal cooling of electronic components 30. Other factors, including applications running, hardware installed, or user preferences may also help controller 60 determine whether to deactivate air flow device 145.

If controller 60 determines that the temperature of electronic components 30 is still greater than a predetermined temperature, air flow device 145 continues to operate. In the alternative, if controller 60 determines that the temperature of electronic devices 30 is at or below a predetermined temperature, controller may deactivate air flow device 145 such that hybrid cooling system 100 returns to a passive mode of operation. Deactivating air flow device may refer to immediately removing power from air flow device (e.g., 5000 RPM initially, 0 RPM), to stepping down the power (e.g. 5000 RPM initially, 2500 RPM for 1 minute, then 0 RPM), or to gradually removing power (e.g., 5000 RPM initially, decreasing by 2500 RPM per minute) or some combination.

In a fourth mode of operation 1010D, hybrid cooling system 100 operates in a passive cooling mode only. In some embodiments, mobile computing device 5 may include a mechanism for manually switching from an active cooling portion to a passive cooling portion of hybrid cooling system 100. The mechanism may be in the form of a physical switch, button, toggle or the like accessible on the outside of mobile computing device, or may be accessible using a mouse to "click on" a button, select a mode from a drop down menu, or some other software implementation. The ability to manually switch to a passive mode of operation may be advantageous in settings where noise is an issue, such as near a microphone or during covert operations. Operating hybrid cooling system 100 in a passive mode only may be advantageous for situations in which noise is undesirable. For example, in an everyday business situation, fan noise during a meeting, especially a teleconference, may be undesirable. In intense situations, such as military or police operations, silence may be critical.

At step 1020D, hybrid cooling system 100 begins operating in a passive mode.

In step 1030C, controller 60 monitors electronic components 30. Monitoring electronic components may be accomplished by directly monitoring a temperature sensor associated with a particular electronic component 30 (e.g., CPU 32), may be accomplished by monitoring a temperature sensor mounted in chassis 15 of mobile computing device 5 and then inferring a temperature associated with electronic component 30, or may be accomplished by monitoring a parameter of a particular electronic component (e.g., monitoring CPU speed) and determining a temperature based on the parameter (e.g., correlating a change in the CPU speed to a CPU temperature).

At step 10400, controller 60 determines if the temperature of electronic components 30 exceeds a threshold amount. If the threshold temperature is not exceeded, hybrid cooling system 100 continues to operate in a passive mode without throttling and continues monitoring electronic components 30 in step 1030B. If the threshold temperature is exceeded, controller 60 may initiate throttling.

At step 1070, hybrid cooling system 100 continues to operate in a passive mode only and throttling continues until either the ambient air temperature drops to allow mobile computing device 5 to operate without throttling or the user selects an option that allows hybrid cooling system 100 to operate in an active cooling mode.

Mobile computing device 5 may operate under any of the conditions according to the four modes. That is, a user might begin using mobile computing device 5 in an ambient air environment less than 25 degrees Celsius (and thus operate according to first mode 1010A), move into an environment in which the ambient air is greater than 25 degrees Celsius but less than 60 degrees Celsius, while using active portion 120 to assist passive portion 110 with cooling (and thus operating according to the second mode 1010B), may then operate into an environment in which the ambient air exceeds 60 degrees Celsius, while using the active portion 120 and some throttling to maintain a preferred performance level (and thus operating according to the third mode 1010C), and may also operate in fourth mode 1010D, which designates no active portion 120 is to be activated, but that throttling (i.e., less than 15%) may be used such that an overall performance is maintained (i.e., 85% or greater maximum processing speed).

In some embodiments, hybrid cooling system 100 having passive cooling portion 110 enables a user to run mobile computing device 5 in a normal room temperature environment under normal, moderate utilization without needing to activate the active component. By operating without air flow device 145, embodiments reduce system noise and power consumption, and may increase mobile computing device reliability. In one embodiment, at 25 degrees Celsius, the chipset would dump heat first into first heat sink 140 attached to air flow device 145. A thermal table may be programmed to have a high trip point such that air flow device 145 would not be activated and heat transfer would be exclusively through convection, such as off an array of fins 142. When fins 142 became saturated, the heat would find an attractive path such that passive cooling would suffice. As long as system utilization remains below a specified level, the air flow device 145 would not be activated.

FIG. 11 depicts charts associated with mobile computing device 5 having a 2.7 GHz processor and 4 GB memory operating in a 23 degrees Celsius (room temperature) environment for 100%, 65% and 50% Burn In Test (BIT) levels. Charts 1110a, 1110b, 1120a, 1120b and 1130b may represent modes of operation 1010B. Chart 1110a may represent mode of operation 1010A.

Charts 1110a, 1120a and 1130a depict charts associated with hybrid cooling system 10 utilizing thermal pads 170 in contact with electronic components 30 and further in contact with heat pipes 130 or heat sinks 150. Charts 1110b, 1120b and 1130b depict charts associated with hybrid cooling system 100 in which thermal pads 170 were not in contact with electronic components 30 or heat pipes 130 or heat sinks 150.

Chart 1110a shows that, for a mobile computing device 5 operating at BIT 100%, air flow device 145 (also referred to here as "FAN") turned on and ran at 3000 RPM four times during a 30 minute test for a total active time of 13:14 (44%). Chart 1110b shows that, for a mobile computing device 5 operating at BIT 100%, air flow device 145 (also referred to here as "FAN") turned on, running at 3000 RPM six times for 12:55 and running at 4300 RPM for 39 seconds during a 30 minute test for a total active time of 13:34 (45%).

Chart 1120a shows that, for a mobile computing device 5 operating at BIT 65%, air flow device 145 (also referred to here as "FAN") turned on and ran at 3000 RPM three times during a 30 minute test for a total active time of 8:09 (27%).

Chart 1120b shows that, for a mobile computing device 5 operating at BIT 65%, air flow device 145 (also referred to here as "FAN") turned on and ran at 3000 RPM six times during a 30 minute test for a total active time of 13:08 (44%).

Chart 1130a shows that, for a mobile computing device 5 operating at BIT 50%, air flow device 145 (also referred to here as "FAN") did not turn on. Chart 1130b shows that, for a mobile computing device 5 operating at BIT 50%, air flow device 145 (also referred to here as "FAN") turned on and ran at 3000 RPM six times during a 30 minute test for a total active time of 8:01 (27%).

Those skilled in the art will appreciate that the Burn-In-Test performed on embodiments of the present invention is a standard test which is designed to evaluate system integrity, but which operates the various components (e.g., CPU, GPU, etc) at a rate much higher than any user could achieve. As such, mobile computing device 5 utilizing hybrid cooling system 100 and operating at room temperature under typical applications might never activate air flow device 145.

It will be noted that the above description are examples only and the construction and configuration of various embodiments of cooling solutions may be determined based upon a wide variety of factors including those factors related to the context in which the embodiment is to be deployed such as the type of printed circuit board with which a cooling solution is to be utilized, type of, or factors associated with the electronic components to be cooled, chassis size, size of chamber, size and construction of heat sinks, size and construction of heat pipe including the type of working fluid used in the heat pipe, size and construction of assembly, specifications of the air movement device utilized, including air flow specifications and dimensions of openings, desired strength to weight ratio, ease of fabrication, including welding, machineability and ductility, size and operational parameters of the air flow device such as dimensions, operational speed, desired sound level, surface area of heat sink fins to size of opening of air movement device or any number of other factors which may be taken into account when designing, constructing or manufacturing such a cooling solution.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:
1. A cooling apparatus for operation in a mobile computing device, comprising:
one or more heat pipes, wherein each of the one or more heat pipes comprises a first portion and a second portion, wherein the first portion is configured for contact with one or more electronic components and the second portion is configured for contact with one or more heat sinks;
a first heat sink thermally connected to the second portion of the one or more heat pipes and exposed to the envi- ronment, wherein the first heat sink is operable to transfer heat energy to the environment via convection;
a second heat sink thermally connected to the one or more heat pipes and exposed to the environment, wherein the second heat sink is operable to transfer heat energy to the environment via convection;
an air flow device coupled to the first heat sink, wherein operation of the air flow device increases heat transfer across the first heat sink;
a controller operable to monitor the electronic components for one or more threshold conditions and operable to activate or deactivate the air flow device; and
a battery for powering the controller, the air flow device, and the one or more electronic components,
wherein the one or more heat pipes, the first heat sink and the second heat sink are configured to transfer, to the ambient air, heat energy generated by the one or more electronic components in the mobile computing device operating in an ambient air temperature less than 25 degrees Celsius,
wherein the one or more heat pipes, the first heat sink, the second heat sink and the air flow device are configured to transfer, to the ambient air, heat energy generated by the one or more electronic components in the mobile computing device operating at 100% CPU speed in an ambient air less than 60 degrees Celsius.

2. The apparatus of claim 1, further comprising a thermally conductive pad in contact with the one or more heat pipes and the one or more electronic components, wherein heat is transferred from the one or more electronic components to the one or more heat pipes substantially using the thermally conductive pad.

3. The apparatus of claim 1, further comprising a bezel, wherein the one or more electronic components comprise a microprocessor and a memory and the bezel comprises a first portion thermally connected to the microprocessor and a second portion thermally connected to the memory, wherein the first portion is thermally isolated from the second portion.

4. The apparatus of claim 3, wherein the bezel comprises a plastic insert to thermally isolate the bezel first portion from the bezel second portion.

5. The apparatus of claim 1, wherein at ambient air temperatures above 60 degrees Celsius, the one or more heat pipes, the first heat sink, the second heat sink and the air flow device are configured to transfer, to the ambient air, heat energy generated by the one or more electronic components in the mobile computing device such that throttling of the ne or more electronic components is restricted, wherein processing speed remains about 85 percent or greater of the maximum processing speed.

6. A system comprising:
a passive cooling portion comprising:
one or more heat pipes, wherein each of the one or more heat pipes comprises a first portion and a second portion, wherein the first portion is configured for contact with one or more electronic components and the second portion is configured for contact with one or more heat sinks;
a first heat sink thermally connected to the second portion of the one or more heat pipes and exposed to the environment, wherein the first heat sink is operable to transfer heat energy to the environment via convection;
a second heat sink thermally connected to the one or more heat pipes and exposed to the environment, wherein the second heat sink is operable to transfer heat energy to the environment via convection;
an active portion further comprising:
an air flow device coupled to the first heat sink, wherein operation of the air flow device increases heat transfer across the first heat sink;
a controller operable to monitor the one or more electronic components for one or more threshold conditions; and
a battery for powering the controller, the air flow device, and the one or more electronic components,
wherein the controller is operable to activate or deactivate the air flow device based on a predetermined condition,
wherein all heat energy generated by the one or more electronic components is transferred to the ambient air using only the passive portion when the ambient air temperature is less than 25 degrees Celsius,
wherein all heat energy generated by the one or more electronic components is transferred to the ambient air using the active portion when the ambient air temperature is greater than 25 degrees Celsius.

7. The system of claim 6, wherein at ambient air temperatures above 60 degrees Celsius, the active portion is configured to transfer, to the ambient air, heat energy generated by the one or more electronic components in the mobile computing device such that throttling of the one or more electronic components is restricted, wherein processing speed remains about 85 percent or greater of the maximum processing speed.

8. The system of claim 6, further comprising a thermally conductive pad in contact with the one or more heat pipes and the one or more electronic components, wherein heat is transferred from the one or more electronic components to the one or more heat pipes substantially using the thermally conductive pad.

9. The system of claim 6, further comprising a bezel, wherein the one or more electronic components comprise a microprocessor and a memory and the bezel comprises a first portion thermally connected to the microprocessor and a second portion thermally connected to the memory, wherein the first portion is thermally isolated from the second portion.

10. The system of claim 9, wherein the bezel comprises a plastic insert to thermally isolate the bezel first portion from the bezel second portion.

11. A method for cooling a mobile computing device, comprising:
providing a hybrid cooling system comprising
a passive cooling portion comprising:
one or more heat pipes, wherein each of the one or more heat pipes comprises a first portion and a second portion, wherein the first portion is configured for contact with one or more electronic components and the second portion is configured for contact with one or more heat sinks;
a first heat sink thermally connected to the second portion of the one or more heat pipes and exposed to the environment, wherein the first heat sink is operable to transfer heat energy to the environment via convection;
a second heat sink thermally connected to the one or more heat pipes and exposed to the environment, wherein the second heat sink is operable to transfer heat energy to the environment via convection;
an active portion further comprising:
an air flow device coupled to the first heat sink, wherein operation of the air flow device increases heat transfer across the first heat sink;

a controller operable to monitor the one or more electronic components for one or more threshold conditions; and a battery for powering the controller, the air flow device, and the one or more electronic components;

monitoring, by the controller, the one or more electronic components in the mobile computing device for one or more predetermined condition, in response to detecting a first predetermined condition, activating the air flow device; and in response to a second predetermined condition, deactivating the air flow device.

12. The method of claim 11, wherein the first predetermined condition comprises a sensed temperature of an electronic component of the one or more electronic components exceeding a predetermined threshold temperature.

13. The method of claim 11, wherein the first predetermined condition comprises a sensed processor speed decreasing below a predetermined threshold speed.

14. The method of claim 11, wherein the first predetermined condition comprises a calculated heat generation rate exceeding a calculated heat removal rate or a heat exhaust rate.

15. The method of claim 11, wherein the second predetermined condition comprises a sensed temperature of an electronic component of the one or more electronic components decreasing below a predetermined threshold temperature.

16. The method of claim 11, wherein the second predetermined condition comprises a sensed processor speed increasing above a predetermined threshold speed.

17. The method of claim 11, wherein the second predetermined condition comprises a calculated heat generation rate decreasing below a calculated heat removal rate or a heat exhaust rate.

18. The method of claim 11, wherein the controller is operable to deactivate the active cooling portion in response to a user selecting a mode of operation designating the air flow device not operate.

19. The method of claim 11, wherein operation of the active portion of the hybrid cooling system comprises throttling the one or more electronic components in the mobile electronic device such that processing speeds are about 85 percent or greater maximum processing speeds.

* * * * *